US012761600B2

(12) United States Patent
Chen et al.

(10) Patent No.: US 12,761,600 B2
(45) Date of Patent: Oct. 13, 2026

(54) ADAPTER, CARTRIDGE, AND IMAGE FORMING APPARATUS

(71) Applicant: Zhuhai Pantum Electronics Co., Ltd., Zhuhai (CN)

(72) Inventors: Feng Chen, Zhuhai (CN); Shujia Hou, Zhuhai (CN); Peng Liu, Zhuhai (CN); Kezheng Ou, Zhuhai (CN); Shun Qian, Zhuhai (CN)

(73) Assignee: Zhuhai Pantum Electronics Co., Ltd., Zhuhai (CN)

( * ) Notice: Subject to any disclaimer, the term of this patent is extended or adjusted under 35 U.S.C. 154(b) by 0 days.

(21) Appl. No.: 18/767,697

(22) Filed: Jul. 9, 2024

(65) Prior Publication Data

US 2025/0021048 A1 Jan. 16, 2025

(30) Foreign Application Priority Data

Jul. 10, 2023 (CN) ........................ 202310845902.4

(51) Int. Cl.
*G03G 21/18* (2006.01)

(52) U.S. Cl.
CPC ....... *G03G 21/1871* (2013.01); *G03G 21/181* (2013.01); *G03G 21/1814* (2013.01); *G03G 2221/1884* (2013.01)

(58) Field of Classification Search
CPC ............. G03G 21/1871; G03G 21/181; G03G 21/1814; G03G 2221/1884; G03G 21/1875; G03G 21/1892; G03G 2215/0695
See application file for complete search history.

(56) References Cited

U.S. PATENT DOCUMENTS

| | | | | |
|---|---|---|---|---|
| 10,466,619 | B2 | 11/2019 | Koyama et al. | |
| 2005/0095017 | A1* | 5/2005 | Kikuchi ............. | G03G 15/0863 399/12 |
| 2010/0008693 | A1* | 1/2010 | Hayashi ............. | G03G 15/0855 399/262 |
| 2017/0277118 | A1 | 9/2017 | Fujii | |
| 2021/0325813 | A1 | 10/2021 | Zhang et al. | |
| 2022/0334532 | A1* | 10/2022 | Fujiwara ............ | G03G 21/1817 |

FOREIGN PATENT DOCUMENTS

| | | | |
|---|---|---|---|
| CN | 101887233 | A | 11/2010 |
| CN | 103853024 | A | 6/2014 |
| CN | 104090471 | A | 10/2014 |

* cited by examiner

*Primary Examiner* — Sandra Brase
(74) *Attorney, Agent, or Firm* — Anova Law Group, PLLC

(57) ABSTRACT

An adapter is provided. The adapter is installed on a cartridge that is detachably arranged on a main body of an image forming apparatus, the image forming apparatus including an accommodation cavity, a conductive unit, a matching unit, and an electric signal responding unit. The adapter includes an electric signal triggering assembly configured to electrically connect with the conductive unit and trigger the electric signal responding unit to obtain a predetermined responding signal, when the electric signal triggering assembly is installed on the cartridge and the cartridge is installed to the predetermined position in the accommodation cavity. The predetermined responding signal is configured to determine whether an installation of the cartridge meets an expectation.

20 Claims, 18 Drawing Sheets

ADAPTER, CARTRIDGE, AND IMAGE FORMING APPARATUS

CROSS-REFERENCE TO RELATED APPLICATION

This application claims priority to Chinese Patent Application No. 202310845902.4, filed on Jul. 10, 2023, the entire content of which is incorporated herein by reference.

TECHNICAL FIELD

The present disclosure relates to the technical field of image forming and, in particular, to a triggering assembly, an adapter, a cartridge, a cartridge assembly, and a detection method.

BACKGROUND

With the development of printing imaging technology, image forming apparatuses such as printers, copiers, fax machines, word processors, etc. have been widely used. For convenience, the image forming apparatuses are usually equipped with consumables that are convenient for users to replace. For example, a consumable cartridge for containing recording materials (such as ink, toner, etc.) is referred to as a cartridge (such as an ink cartridge, a toner cartridge, a toner cylinder, etc.). When the recording material in the cartridge is consumed, the user only needs to replace the cartridge, and the image forming apparatus can continue to be used.

A color image forming apparatus includes a plurality of cartridges for containing toners of basic colors and an imaging assembly of corresponding basic colors arranged in the color image forming apparatus. A cartridge supplies the toner in the cartridge to the corresponding color imaging assembly. The imaging assembly includes a photosensitive drum, a charging assembly, and a developing assembly. The charging assembly can make the surface of the photosensitive drum uniformly charged. Thus, the uniformly charged surface of photosensitive drum carries an electrostatic latent image, and the electrostatic latent image is developed by the developing assembly and toner. By superimposing toners of multiple basic colors, a variety of colors can be obtained, thereby forming a color image. Exemplarily, a color image forming apparatus includes cartridges for containing yellow (Y), magenta (M), cyan (C), and black (K) toners respectively. Corresponding to the cartridges, accommodation cavities for accommodating the cartridges of corresponding colors is provided on the image forming apparatus. It can be understood that the yellow, magenta, cyan, and black cartridges are installed in the yellow, magenta, cyan and black accommodation cavities, respectively, in order.

In order to reduce costs, cartridges corresponding to different colors are usually set to a same structure in a standardized processing manner. Therefore, when a user installs cartridges of multiple colors, the installation order may be confused. For example, a magenta cartridge is installed in a cyan accommodation cavity; and a cyan cartridge is installed in a magenta accommodation cavity. In this case, magenta toner will be supplied to the cyan imaging assembly. Cyan toner will be supplied to the magenta imaging assembly, resulting in development degradation or image quality degradation, thereby affecting user experience.

In addition, the cartridge may not be properly installed due to the over length of the imaging assembly. When the cartridge is not properly installed, the toner in the cartridge cannot be normally supplied to the imaging assembly, which will also lead to development degradation or image quality degradation, thereby affecting the user experience.

SUMMARY

One aspect of the present disclosure provides an adapter. The adapter is installed on a cartridge that is detachably arranged on a main body of an image forming apparatus, the image forming apparatus including an accommodation cavity, a conductive unit, a matching unit, and an electric signal responding unit. The adapter includes an electric signal triggering assembly configured to electrically connect with the conductive unit and trigger the electric signal responding unit to obtain a predetermined responding signal, when the electric signal triggering assembly is installed on the cartridge and the cartridge is installed to the predetermined position in the accommodation cavity. The predetermined responding signal is configured to determine whether an installation of the cartridge meets an expectation.

Another aspect of the present disclosure provides a cartridge, detachably arranged on a main body of an image forming apparatus. The image forming apparatus includes an accommodation cavity, a conductive unit, a matching unit, and an electric signal responding unit. The cartridge includes: an assembly unit, being arranged on a housing and being configured to cooperate with the matching unit in the accommodation cavity, making the cartridge to be installed to a predetermined position in the accommodation cavity; and an electric signal triggering assembly, being arranged on the assembly unit and being configured to electrically connect to the conductive unit and trigger the electric signal responding unit to obtain a predetermined responding signal, when the cartridge is installed to the predetermined position in the accommodation cavity. The predetermined responding signal is configured to determine whether an installation of the cartridge meets an expectation.

Another aspect of the present disclosure provides an image forming apparatus. The image forming apparatus includes a main body that includes a frame and an accommodation cavity used to accommodate a cartridge. The accommodation cavity is provided with a matching unit, the matching unit is provided with a first conductive component and a second conductive component, an electric signal responding unit is electrically connected to the first conductive component and is used to obtain a predetermined responding signal, and to determine, when the cartridge is installed to a predetermined position in the accommodation cavity, whether the installation of the cartridge meets with an expectation based on the predetermined responding signal.

Another aspect of the present disclosure provides a cartridge assembly, detachably installed on a main body of an image forming apparatus. The cartridge assembly includes a plurality of cartridges. The image forming apparatus has an accommodation cavity, a conductive unit, a matching unit, and an electric signal responding unit. A cartridge of the plurality of cartridges has an assembly unit and an electric signal triggering assembly. The assembly unit is arranged on a housing and configured to cooperate with the matching unit in the accommodation cavity, making the cartridge to be installed to a predetermined position in the accommodation cavity. The electric signal triggering assembly is arranged on the assembly unit. The electric signal triggering assembly is configured to electrically connect to the conductive unit and trigger the electric signal responding unit to obtain a predetermined responding signal, when the cartridge is installed to the predetermined position in the accommodation cavity. The predetermined responding signal is configured to determine whether an installation of the cartridge meets an expectation.

Another aspect of the present disclosure provides a detection method, applied to an image forming apparatus. A cartridge is installed on the image forming apparatus and the cartridge is detachably arranged on a main body of the image forming apparatus. The image forming apparatus has an accommodation cavity, a conductive unit, a matching unit, and an electric signal responding unit. A cartridge has an assembly unit and an electric signal triggering assembly. The assembly unit is arranged on a housing and configured to cooperate with the matching unit in the accommodation cavity, making the cartridge to be installed to a predetermined position in the accommodation cavity. The electric signal triggering assembly is arranged on the assembly unit. The electric signal triggering assembly is configured to electrically connect to the conductive unit and trigger the electric signal responding unit to obtain a predetermined responding signal, when the cartridge is installed to the predetermined position in the accommodation cavity. The predetermined responding signal is configured to determine whether an installation of the cartridge meets an expectation. The detection method includes obtaining the predetermined responding signal corresponding to the cartridge and determining whether the installation of the cartridge meets the expectation based on the predetermined responding signal.

BRIEF DESCRIPTION OF THE DRAWINGS

In order to better convey embodiments of the present disclosure or the technical solutions, a brief introduction will be described below to the drawings for the description of embodiments or technical solutions. Obviously, the drawings in the following description are some embodiments of the present disclosure. For those persons of ordinary skill in the art, other drawings can be obtained based on these drawings without exerting any creative effort.

DETAILED DESCRIPTION OF THE EMBODIMENTS

To better convey technical solutions of the present disclosure, embodiments of the present disclosure are described in detail below with reference to accompanying drawings.

Please note that described embodiments are only a part of embodiments of the present disclosure, rather than all embodiments. Based on embodiments of the present disclosure, other embodiments obtained by those persons of ordinary skill in the art without creative work are within the scope of protection of the present disclosure.

The terms used in embodiments of the present disclosure are only for the purpose of describing specific embodiments, and are not intended to limit the present disclosure. Singular forms “a”, “said”, and “the” used in embodiments of the present disclosure and claims are also intended to include plural forms, unless the context clearly indicates other meanings.

Figure 1:
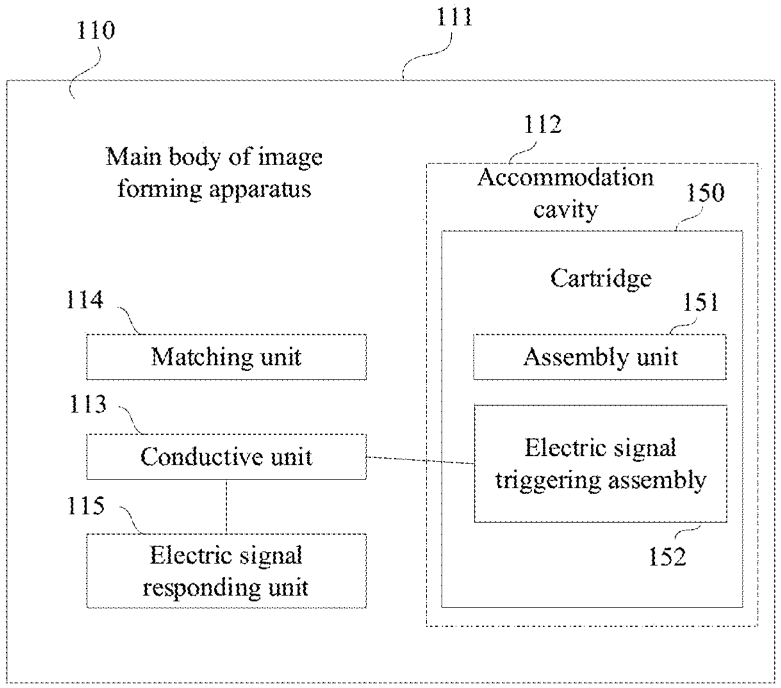
FIG. 1 illustrates a structural block diagram of an image forming apparatus according to various embodiments of the present disclosure.

FIG. 1 is a structural block diagram of an image forming apparatus according to embodiments of the present disclosure. As shown in FIG. 1, the image forming apparatus 100 includes a main body 110 of the image forming apparatus (in other parts of the present disclosure, the main body of the image forming apparatus 110 may also be referred to as "main body") and a cartridge 150. For example, the cartridge 150 can be an ink cartridge, a toner cartridge, a toner cylinder, etc.

The main body 110 of the image forming apparatus includes a frame 111 and an accommodation cavity 112. The accommodation cavity 112 is used to accommodate the cartridge 150. A matching unit 114 is provided on a frame 111. An assembly unit 151 matching the matching unit 114 is provided on the cartridge 150. The assembly unit 151 matches with the matching unit 114, so that the cartridge 150 can be installed to a predetermined position in the accommodation cavity 112. In addition, a conductive unit 113 and an electric signal responding unit 115 are also provided on the frame 111. The electric signal responding unit 115 in the present disclosure is electrically connected to the conductive unit 113 and a control apparatus of the main body 110 of the image forming apparatus respectively. An electric signal triggering assembly 152 matching the conductive unit 113 is provided on the cartridge 150. When the cartridge 150 is installed to the predetermined position in the accommodation cavity 112, the electric signal triggering assembly 152 is electrically connected to the conductive unit 113, and triggers the electric signal responding unit 115 to obtain a predetermined responding signal. The predetermined responding signal is used to determine whether the installation of the cartridge 150 meets an expectation, that is, to determine whether the cartridge 150 is installed in place.

In the present disclosure, when the cartridge 150 is installed to a predetermined position in the accommodation cavity 112, the cartridge 150 is installed in the main body 110 of the image forming apparatus and can normally perform image forming operations, such as normal printing and normal supply of toner.

In one implementation, the predetermined responding signal is a high-level signal (for example, a 3.3V voltage signal). Specifically, when the cartridge 150 is installed to a predetermined position in the accommodation cavity 112, the electric signal triggering assembly 152 is electrically connected to the conductive unit 113, and triggers the electric signal responding unit 115 to obtain the high-level signal. According to the high-level signal, it can be determined that whether the installation of the cartridge 150 meets expectations, that is, it is installed in place. On the contrary, if the electric signal responding unit 115 obtains a low-level signal, it means that the installation of the cartridge 150 does not meet the expectation, that is, it is not installed in place.

Similarly, the predetermined responding signal can also be a low-level signal (e.g., a 0V voltage signal). Specifically, when the cartridge 150 is installed to the predetermined position in the accommodation cavity 112, the electric signal triggering assembly 152 is electrically connected to the conductive unit 113, and triggers the electric signal responding unit 115 to obtain a low-level signal. According to the low-level signal, it can be determined that whether the installation of the cartridge 150 meets the expectation, that is, it is installed in place. On the contrary, if the electric signal responding unit 115 obtains the high-level signal, it means that the installation of the cartridge 150 does not meet the expectation, that is, it is not installed in place.

In embodiments of the present disclosure, since the electric signal triggering assembly 152 can determine whether the installation of the cartridge 150 meets the expectation through a predetermined responding signal. This can avoid a scenario of development degradation or image quality degradation caused by improper installation of the cartridge 150.

To better convey the idea, a technical solution is exemplarily described below in conjunction with a specific structure of the image forming apparatus 100.

Figure 2:
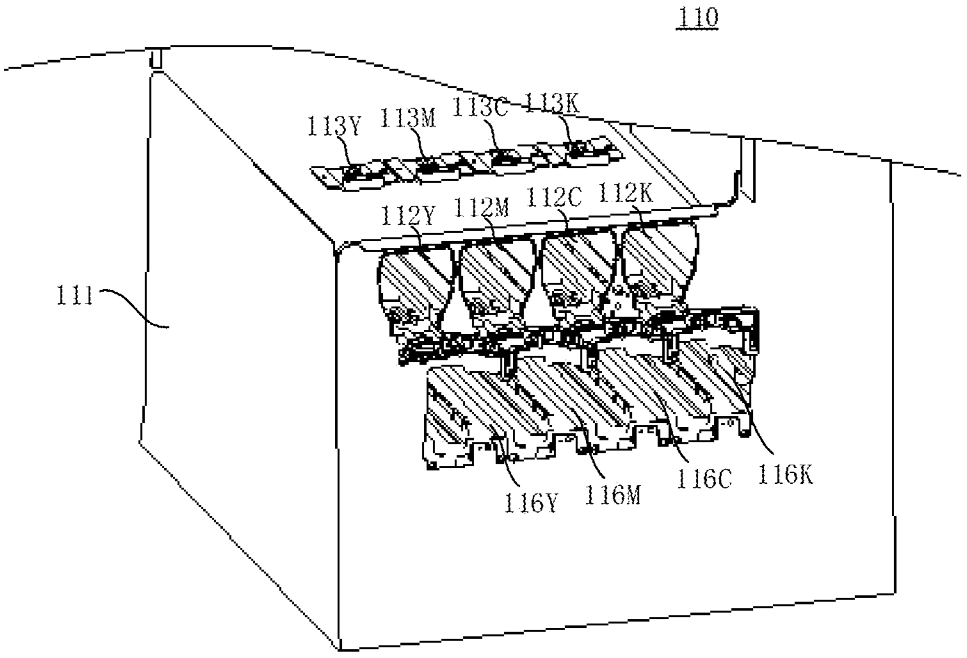
FIG. 2 illustrates schematic diagram of a local structure of a main body of an image forming apparatus according to various embodiments of the present disclosure.
Figure 3:
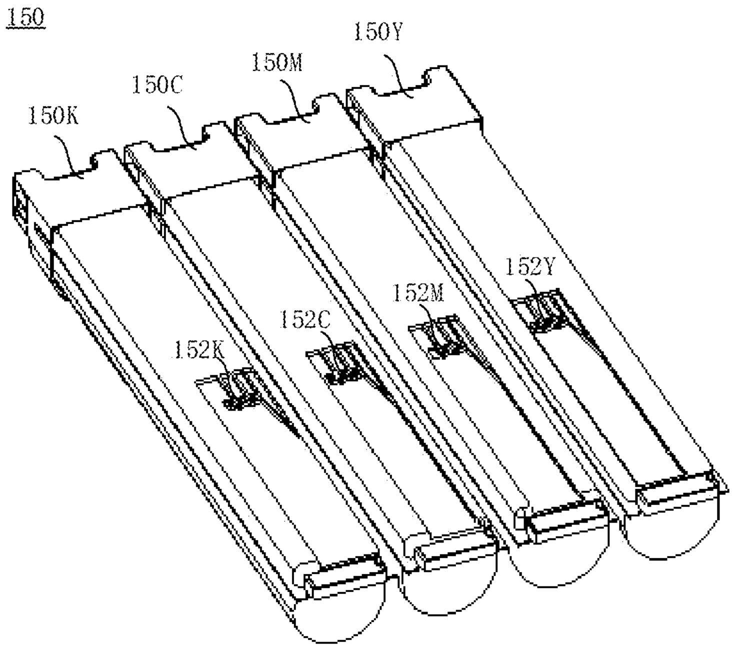
FIG. 3 illustrates a schematic structural diagram of a cartridge according to various embodiments of the present disclosure.

FIG. 2 shows a local structural diagram of a main body of an image forming device apparatus provided in embodiments of the present disclosure. FIG. 3 shows a structural diagram of a cartridge provided in embodiments of the present disclosure. As shown in FIG. 2 and FIG. 3, the main body 110 of the image forming apparatus includes a frame 111 and accommodation cavities 112Y~K. The accommodation cavities 112Y~K match the structure of the cartridges 150Y~K (specifically, it can be a toner cylinder), so that the cartridges 150Y~K can be installed to predetermined positions in the accommodation cavities 112Y~K. In addition, conductive units 113Y~K are provided on the frame 111, and electric signal triggering assemblies 152Y~K matching the conductive units 113Y~K are provided on the cartridges 150Y~K. When the cartridges 150Y~K are installed to the predetermined positions in the accommodation cavities 112Y~K, the electric signal triggering assemblies 152Y~K are electrically connected to the conductive units 113Y~K, and trigger the electric signal responding unit 115 (not shown in the figure) to obtain a predetermined responding signal. The predetermined responding signal is used to determine whether the installation of the cartridges 150Y~K meets the expectation.

Figure 4:
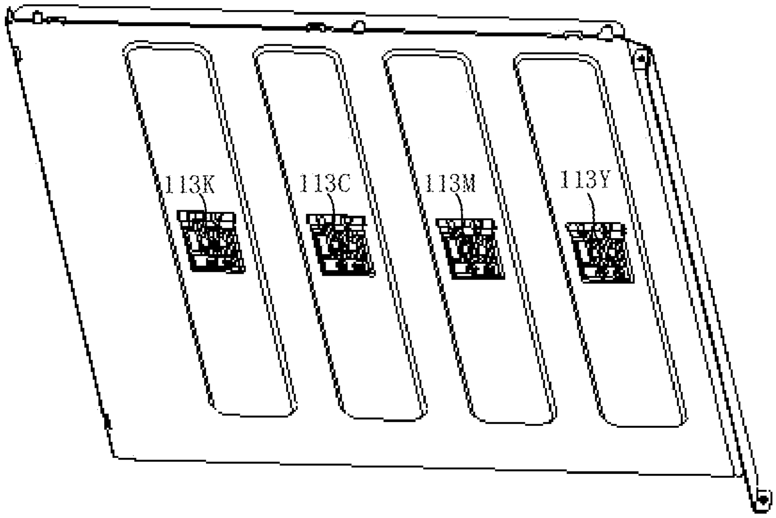
FIG. 4 illustrates a schematic structural diagram of a sheet metal component according to various embodiments of the present disclosure.

As shown in FIG. 2 and FIG. 4, in one implementation, the frame 111 includes a sheet metal component, and conductive units 113Y~K are arranged on the sheet metal component. When the sheet metal component is fixed to above the accommodation cavities 112Y~K, one end of the conductive units 113Y~K is exposed in the accommodation cavities 112Y~K. The other end passes through the sheet metal component for electrically connecting to other functional units (for example, the electric signal responding unit 115) of the image forming apparatus 100. In addition, imaging assembly accommodation cavities 116Y~K are also provided on the main body 110 of the image forming apparatus. A structure of the imaging assembly accommodation cavities 116Y~K matches that of the imaging assembly (not shown in the figure), so that the imaging assembly can be installed to a predetermined position in an imaging assembly accommodation cavity 116.

It should be noted that the main body 110 of the image forming apparatus and the cartridges 150Y~K shown in FIGS. 2 to 4 correspond to a color image forming apparatus 100. Therefore, the main body 110 of the image forming apparatus includes a plurality of accommodation cavities 112Y~K and a plurality of cartridges 150Y~K corresponding to the plurality of accommodation cavities 112Y~K. To avoid confusion when the user installs the plurality of cartridges 150Y~K in the plurality of accommodation cavities 112Y~K, different accommodation cavities 112Y~K and different cartridges 150Y~K are set differently. Thus, the user can only install the cartridges 150Y~K to predetermined accommodation cavities 112Y~K, which will be described in detail below.

Figure 5:
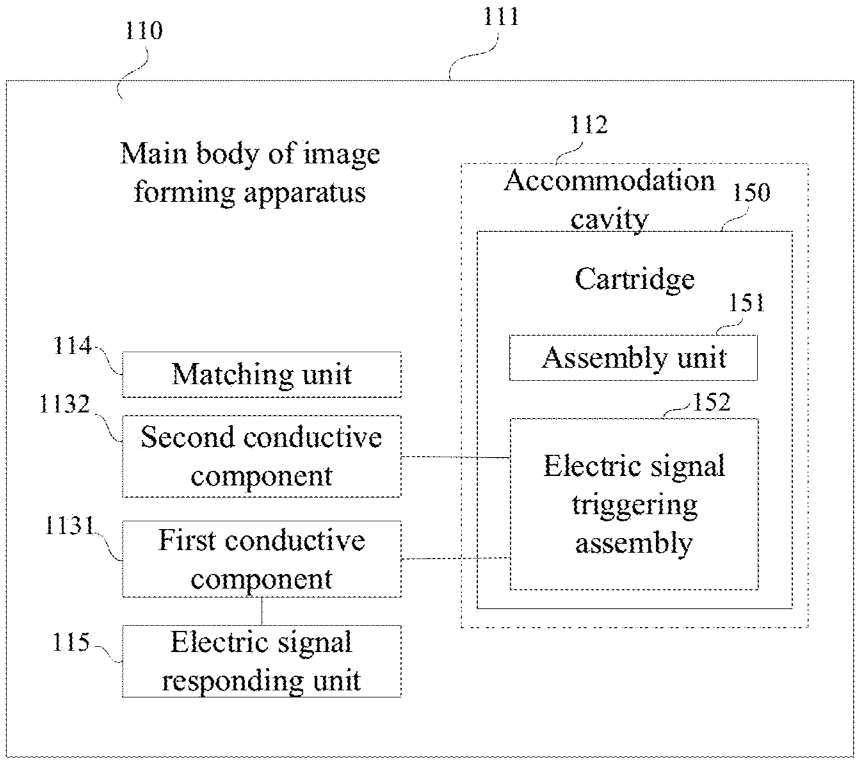
FIG. 5 illustrates a structural block diagram of another image forming apparatus according to various embodiments of the present disclosure.

FIG. 5 is a structural block diagram of another image forming apparatus provided in embodiments of the present disclosure. As shown in FIG. 5, based on FIG. 1, embodiments of the present disclosure, the conductive unit 113 further includes a first conductive component 1131 and a second conductive component 1132. When the cartridge 150 is not installed to the predetermined position in the accommodation cavity 112, the first conductive component 1131 and the second conductive component 1132 are electrically isolated. The electrical isolation here can be understood as the first conductive component 1131 and the second conductive component 1132 are insulated from each other, that is, there is no electrical connection relationship. When the cartridge 150 is installed to the predetermined position in the accommodation cavity 112, the electric signal triggering assembly 152 is electrically connected to the first conductive component 1131 and the second conductive component 1132 respectively (as shown in the state of FIG. 5), thereby triggering the electric signal responding unit 115 to obtain the predetermined responding signal.

Exemplarily, the first conductive component 1131 is connected to a 0V voltage, the second conductive component 1132 is connected to a 3.3V voltage, and the electric signal responding unit 115 is electrically connected to the first conductive component 1131. It can be understood that when the cartridge 150 is not installed to the predetermined position in the accommodation cavity 112, the first conductive component 1131 and the second conductive component 1132 are electrically isolated. The electric signal responding unit 115 obtains a 0V voltage. When the cartridge 150 is installed to the predetermined position in the accommodation cavity 112, the electric signal triggering assembly 152 is electrically connected to the first conductive component 1131 and the second conductive component 1132 respectively, thereby making the first conductive component 1131 and the second conductive component 1132 electrically connected. The electric signal responding unit 115 obtains a 3.3V voltage. Based on the voltage change, it can be determined whether the cartridge 150 is installed to the predetermined position in the accommodation cavity 112.

Similarly, if the first conductive component 1131 is connected to a 3.3V voltage and the second conductive component 1132 is connected to a 0V voltage, the electric signal responding unit 115 is electrically connected to the first conductive component 1131. It can be understood that when the cartridge 150 is not installed to the predetermined position in the accommodation cavity 112, the first conductive component 1131 and the second conductive component 1132 are electrically isolated. The electric signal responding unit 115 obtains a 3.3V voltage. When the cartridge 150 is installed to the predetermined position in the accommodation cavity 112, the electric signal triggering assembly 152 is electrically connected to the first conductive component 1131 and the second conductive component 1132 respectively, thereby making the first conductive component 1131 and the second conductive component 1132 electrically connected. The electric signal responding unit 115 obtains a 0V voltage. Based on the voltage change, it can be determined whether the cartridge 150 is installed to the predetermined position in the accommodation cavity 112.

In embodiments of the present disclosure, the electrical connection in "the electric signal triggering assembly 152 is electrically connected to the first conductive component 1131 and the second conductive component 1132 respectively" can be a contact electrical connection or a non-contact electrical connection. For example, the non-contact electrical connection can be achieved through the principle of electromagnetic conversion, etc., and embodiments of the present disclosure do not limit this.

In one implementation, the frame 111 includes a top plate and a side plate that are adjacently arranged. The first conductive component 1131 and the second conductive component 1132 are arranged on the top plate, and the electric signal responding unit 115 is arranged on the side plate.

Figure 6:
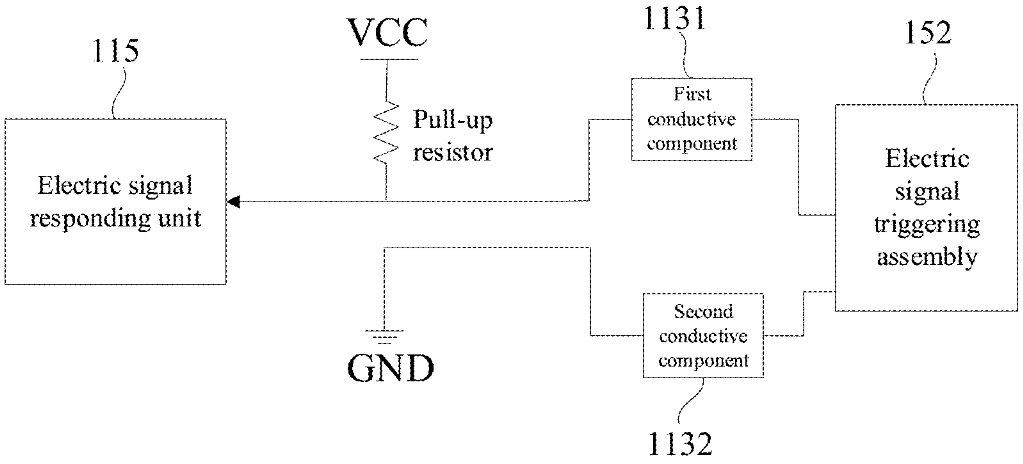
FIG. 6 illustrates a structural block diagram of another image forming apparatus according to various embodiments of the present disclosure.

Referring to FIG. 6, based on FIG. 5, embodiments of the present disclosure further describe that the first conductive component 1131 and the second conductive component 1132 are disposed on the top plate of the frame 111. The first conductive component 1131 is electrically connected to a power source of the main body 110 of the image forming apparatus through a pull-up resistor, and the second conductive component 1132 is grounded. The electric signal responding unit 115 is disposed on the side plate. The electric signal responding unit 115 is electrically connected to the first conductive component 1131. The electric signal responding unit 115 is also electrically connected to a power source of the main body 110 of the image forming apparatus through a pull-up resistor, obtaining a high-level signal (for example, a 3.3V voltage signal) as the predetermined responding signal. Specifically, when the cartridge 150 is installed to the predetermined position in the accommodation cavity 112, the electric signal triggering assembly 152 is electrically connected to the first conductive component 1131 and the second conductive component 1132. The electric signal triggering assembly 152 electrically connects the first conductive component 1131 and the second conductive component 1132 to form a short circuit. Then, the pull-up resistor is grounded to form a low-level signal. Thus, the electric signal responding unit 115 obtains a low-level signal. This can determine that the installation of the cartridge 150 meets the expectation, that is, it is installed in place.

Similarly, in other embodiments, the second conductive component 1132 of the main body 110 of the image forming apparatus can also be electrically connected to the power supply unit through the pull-up resistor. The first conductive component 1131 is grounded. Thus, when the electric signal triggering assembly 152 is electrically connected to the first conductive component 1131 and the second conductive component 1132, the electric signal responding unit obtains a high-level signal. Thus, it can determine that the installation of the cartridge 150 meets the expectation, that is, it is installed in place.

Figure 7:
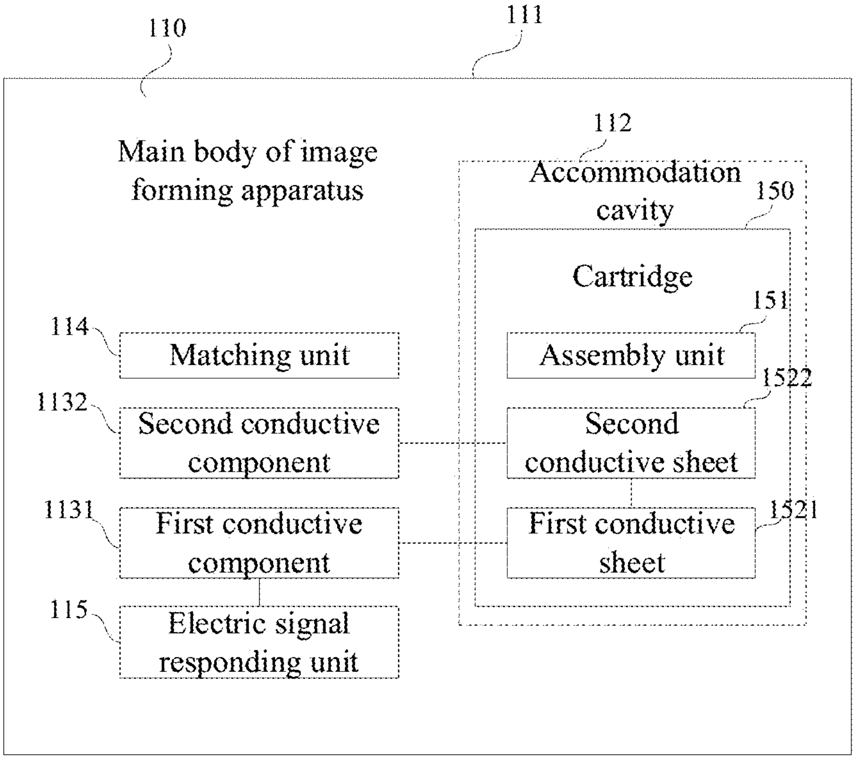
FIG. 7 illustrates a structural block diagram of another image forming apparatus according to various embodiments of the present disclosure.

FIG. 7 shows a structural block diagram of another image forming apparatus provided in embodiments of the present disclosure. As shown in FIG. 7, based on FIG. 5, the electric signal triggering assembly 152 in embodiments of the present disclosure further includes a first conductive sheet 1521 and a second conductive sheet 1522. The first conductive sheet 1521 and the second conductive sheet 1522 are electrically connected. When the cartridge 150 is installed to a predetermined position in the accommodation cavity 112, the first conductive sheet 1521 is electrically connected to the first conductive component 1131, and the second conductive sheet 1522 is electrically connected to the second conductive component 1132. Thus, the first conductive component 1131 is electrically connected to the second conductive component 1132, thereby triggering the electric signal responding unit 115 to obtain the predetermined responding signal.

In embodiments of the present disclosure, the electrical connection in "the first conductive sheet 1521 is electrically connected to the first conductive component 1131, and the second conductive sheet 1522 is electrically connected to the second conductive component 1132" can be a contact electrical connection or a non-contact electrical connection. For example, the non-contact electrical connection can be achieved through the principle of electromagnetic conversion, etc., and embodiments of the present disclosure do not limit this.

In one implementation, the first conductive component 1131 and the second conductive component 1132 respectively include a metal conductive sheet or a plurality of metal conductive sheets electrically connected to each other. Further, when the first conductive component 1131 and the second conductive component 1132 are respectively two metal conductive sheets and electrically connected to each other, the two metal conductive sheets form a V-shape after contact. Alternatively, the shape of the first conductive component 1131 and the second conductive component 1132 can be a regular shape or an irregular shape, which is not limited in embodiments of the present disclosure.

In one implementation, the first conductive sheet 1521 and the second conductive sheet 1522 respectively include one metal conductive sheet or a plurality of metal conductive sheets electrically connected to each other. Further, when the first conductive sheet 1521 and the second conductive sheet 1522 are respectively two metal conductive sheets and electrically connected to each other, the two metal conductive sheets form a V-shape after contact. Alternatively, the shape of the first conductive sheet 1521 and the second conductive sheet 1522 can a regular shape or an irregular shape. Embodiments of the present disclosure do not limit it.

The conductive unit 113 and the electric signal triggering assembly 152 that matches with each other in the above technical solution are exemplarily described below in conjunction with the specific structure of the image forming apparatus 100.

Figure 8:
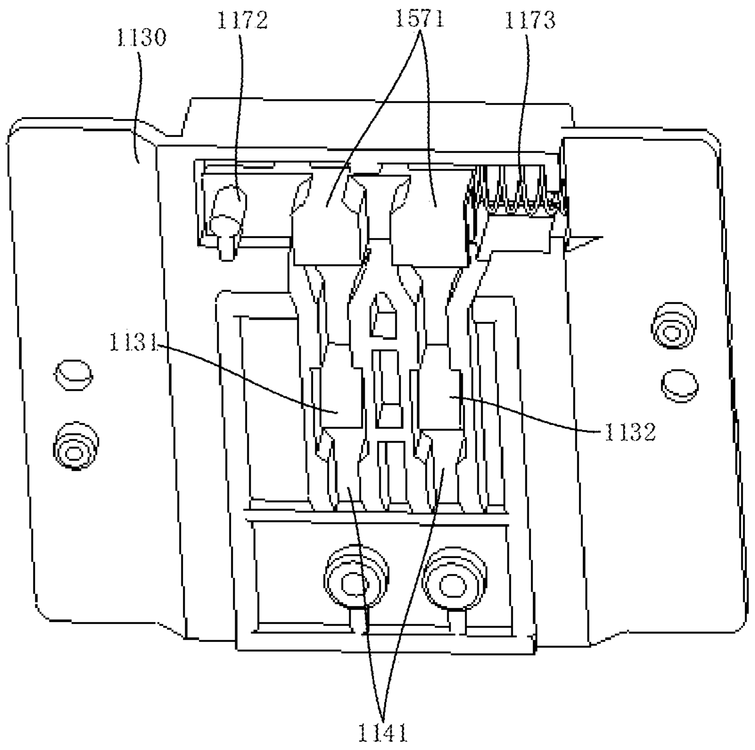
FIG. 8 illustrates a schematic structural diagram of a conductive unit according to various embodiments of the present disclosure.
Figure 9:
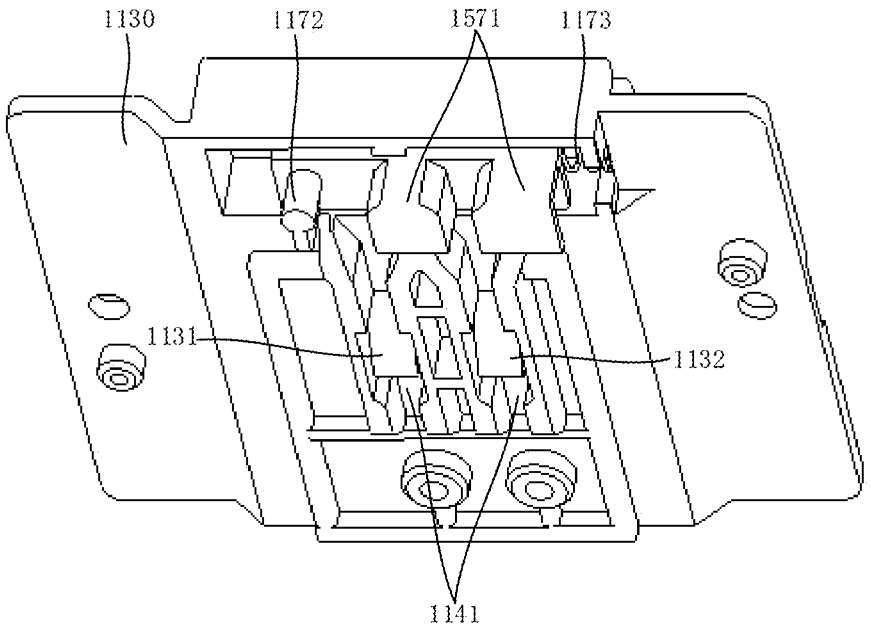
FIG. 9 illustrates a schematic structural diagram of another conductive unit according to various embodiments of the present disclosure.
Figure 10:
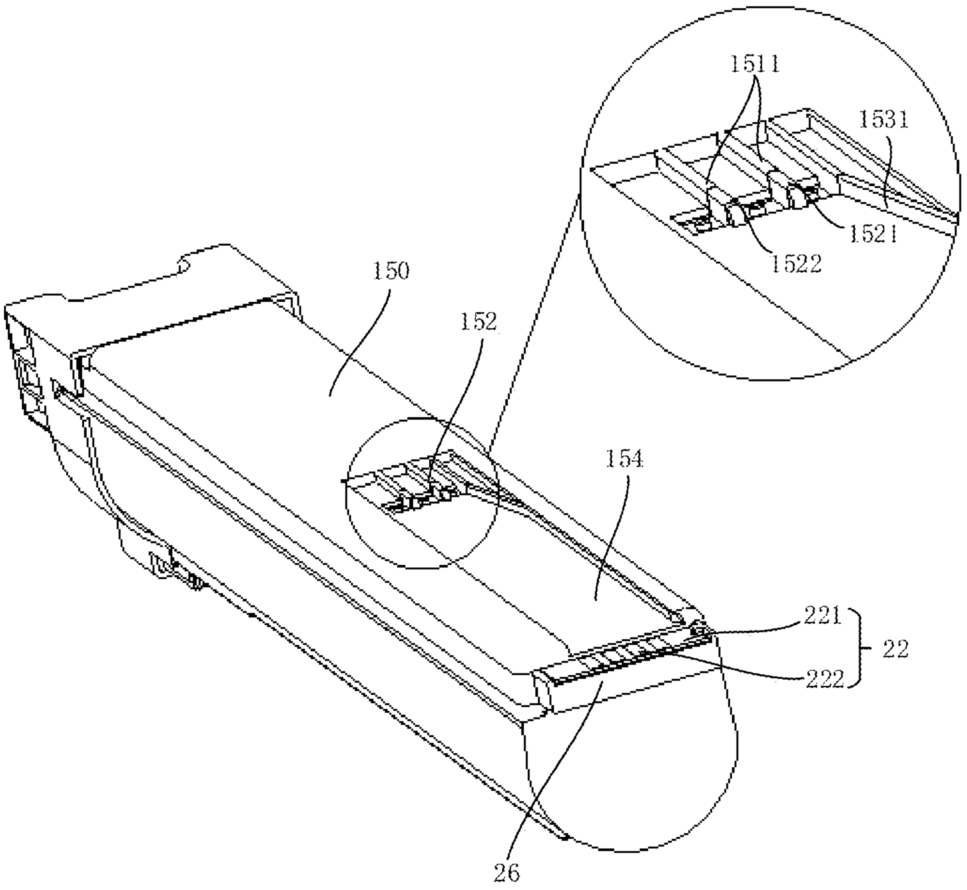
FIG. 10 illustrates a schematic structural diagram of a cartridge that matches the conductive unit in FIG. 8 and FIG. 9 according to various embodiments of the present disclosure.
Figure 11:
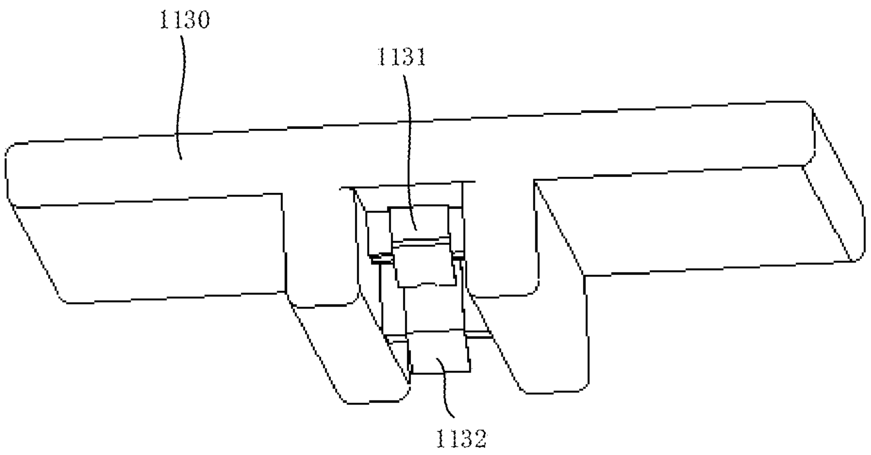
FIG. 11 illustrates a schematic structural diagram of another conductive unit according to various embodiments of the present disclosure.
Figure 12:
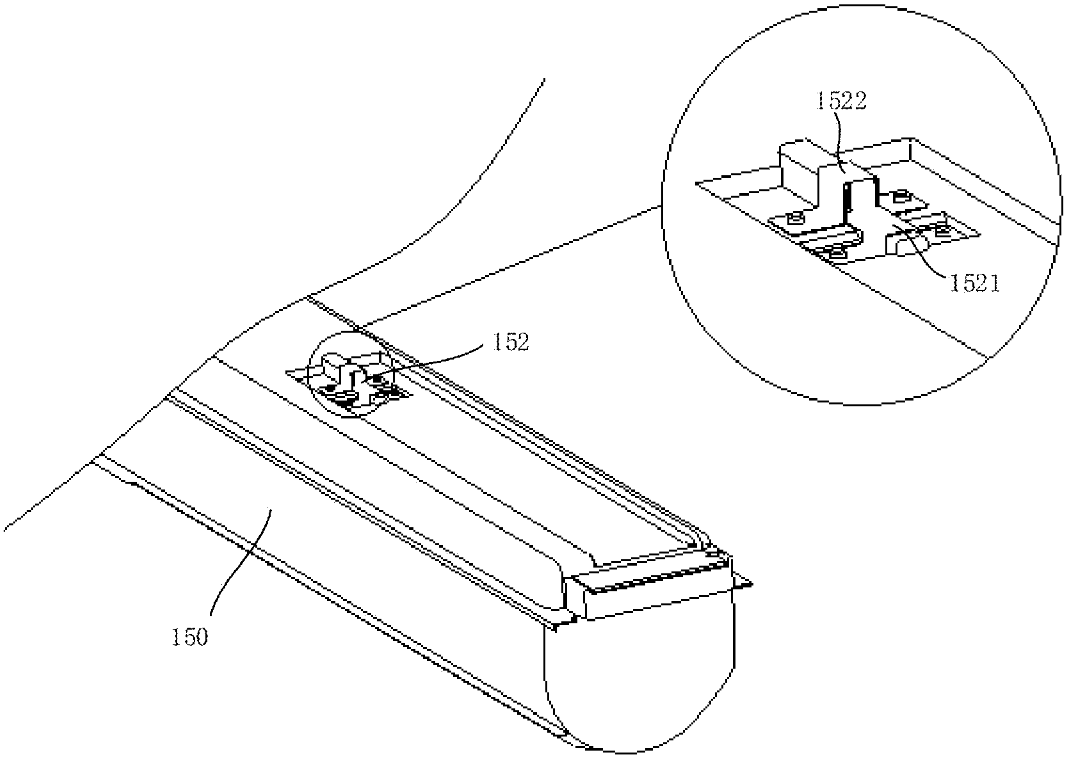
FIG. 12 illustrates a schematic diagram of a local structure of a cartridge that matches the conductive unit in FIG. 11 according to various embodiments of the present disclosure.

FIG. 8 and FIG. 9 show a schematic structural diagram of a conductive unit provided in embodiments of the present disclosure. FIG. 10 is a schematic structural diagram of the cartridge 150, provided in embodiments of the present disclosure, matching the conductive unit 113 shown in FIG. 8 and FIG. 9. As shown in FIG. 8 to FIG. 10, in embodiments of the present disclosure, the conductive unit 113 includes a conductive unit bracket 1130. A first conductive component 1131 and a second conductive component 1132 that are electrically isolated are provided on the conductive unit bracket 1130. The first conductive component 1131 and the second conductive component 1132 are arranged along a left-right direction (the orientation shown in the figure) on the conductive unit bracket 1130. The electric signal triggering assembly 152 includes a first conductive sheet 1521 and a second conductive sheet 1522 that are electrically connected, and the first conductive sheet 1521 and the second conductive sheet 1522 are arranged along the left-right direction in the cartridge 150. When the cartridge 150 is installed to a predetermined position in the accommodation cavity 112, the first conductive sheet 1521 is electrically connected to the first conductive component 1131, and the second conductive sheet 1522 is electrically connected to the second conductive component 1132. Thus, the first conductive component 1131 is electrically connected to the second conductive component 1132, thereby triggering the electric signal responding unit 115 to obtain a predetermined response signal. FIG. 11 is a schematic structural diagram of another conductive unit 113 provided in embodiments of the present disclosure. FIG. 12 is a schematic local structural diagram of the cartridge 150 provided in embodiments of the present disclosure that matches the conductive unit 113 shown in FIG. 11. As shown in FIG. 11 and FIG. 12, in embodiment of the present disclosure, the conductive unit 113 includes a conductive unit bracket 1130. On the conductive unit bracket 1130, there are electrically isolated a first conductive component 1131 and a second conductive component 1132. Moreover, the first conductive component 1131 and the second conductive component 1132 are arranged on the conductive unit bracket 1130 along an up-down direction (the orientation shown in the figure). The electric signal triggering assembly 152 includes a first conductive sheet 1521 and a second conductive sheet 1522 that are electrically connected. The first conductive sheet 1521 and the second conductive sheet 1522 are arranged in the up-down direction on the cartridge 150. When the cartridge 150 is installed to a predetermined position in the accommodation cavity 112, the first conductive sheet 1521 is electrically connected to the first conductive component 1131, and the second conductive sheet 1522 is electrically connected to the second conductive component 1132. Thus, the first conductive component 1131 is electrically connected to the second conductive component 1132, thereby triggering the electric signal responding unit 115 to obtain a predetermined responding signal.

It should be noted that FIGS. 8 to 12 are only exemplary illustrations of specific structures of the conductive unit 113 and the electric signal triggering assembly 152 in embodiments of the present disclosure, and should not be used as a limitation on the protection scope of the present disclosure. Those persons of skilled in the art should understand that the conductive unit 113 and the electric signal triggering assembly 152 can also be set to other shapes or structures. However, if the condition of "when the cartridge 150 is installed to the predetermined position in the accommodation cavity 112, the electric signal triggering assembly 152 is electrically connected to the conductive unit 113, and triggers the electric signal responding unit 115 to obtain a predetermined responding signal" is met, it should fall within the protection scope of the present disclosure.

In one implementation, the assembly unit 151 on the cartridge 150 and the matching unit 114 on the main body 110 of the image forming apparatus can adopt mutually matching groove and protrusion structures. For example, in FIGS. 8 to 10, the assembly unit 151 on the cartridge 150 includes two first protrusions 1511. The first conductive sheet 1521 and the second conductive sheet 1522 are respectively arranged on the two first protrusions 1511. Correspondingly, the matching unit 114 on the main body 110 of the image forming apparatus includes two first grooves 1141 matching the two first protrusions 1511. The first conductive component 1131 and the second conductive component 1132 are respectively arranged on the two first grooves 1141. Through the matching between the first groove 1141 and the first protrusion 1511, the cartridge 150 can be installed to a predetermined position in the accommodation cavity 112. After the cartridge 150 is installed to the predetermined position in the accommodation cavity 112, the first conductive sheet 1521 is electrically connected to the first conductive component 1131, and the second conductive sheet 1522 is electrically connected to the second conductive component 1132. Thus, the first conductive component 1131 is electrically connected to the second conductive component 1132, thereby triggering the electric signal responding unit 115 to obtain a predetermined responding signal.

Based on the same principle, the assembly unit 151 on the cartridge 150 can also be arranged as a second groove. The matching unit 114 on the main body 110 of the image forming apparatus can be arranged as a second protrusion. Through the matching of the second groove and the second protrusion, the cartridge 150 can be installed to a predetermined position in the accommodation cavity 112. The specific content can be referred to the description of the above embodiment, and will not be repeated here.

Figure 13:
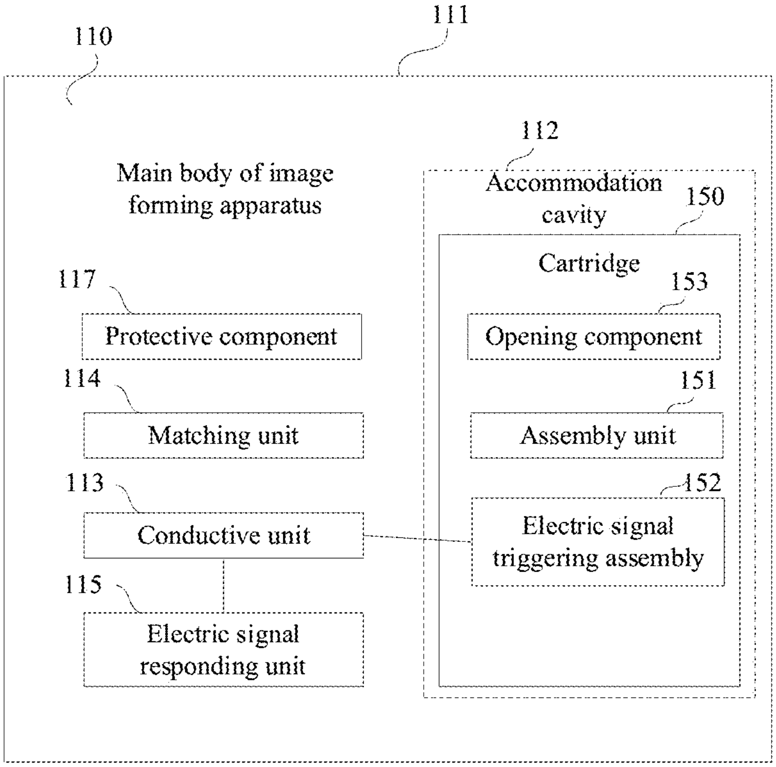
FIG. 13 illustrates a structural block diagram of another image forming apparatus according to various embodiments of the present disclosure.

FIG. 13 is a structural block diagram of another image forming apparatus provided in embodiments of the present disclosure. As shown in FIG. 13, based on FIG. 1, in embodiments of the present disclosure, a protective component 117 is further provided on the frame 111. The protective component 117 is used to cover at least a portion of the conductive unit 113 when the cartridge 150 is not installed to the predetermined position in the accommodation cavity 112. This protects the conductive unit 113 and prevents the conductive unit 113 from being damaged by an external force. Further, in order to improve the protective effect of the protective component 117 on the conductive unit 113, when the cartridge 150 is not installed to the predetermined position in the accommodation cavity 112, the protective component 117 can cover an entire area of the conductive unit 113 to achieve a comprehensive protection of the conductive unit 113.

Corresponding to the protective component 117, an opening component 153 is also provided on the cartridge 150. When the cartridge 150 is installed to a predetermined position in the accommodation cavity 112, the opening component 153 can trigger the protective component 117 to release the cover of the conductive unit 113. This makes the electric signal triggering assembly 152 to be electrically connected to the conductive unit 113, triggering the electric signal responding unit 115 to obtain a predetermined responding signal.

Please continue to refer to FIGS. 8 and 9. In embodiments of the present disclosure, the protective component 117 includes a blocking component and an elastic component 1173 (e.g., a spring). The blocking component includes a blocking part 1571 and a matching part 1172. The blocking part 1571 is used to cover at least a portion of the conductive unit 113 under the elastic force of the elastic component 1173, when the cartridge 150 is not installed to the predetermined position in the accommodation cavity 112.

Specifically, one end of the elastic component 1173 contacts the conductive unit bracket 1130. The other end of the elastic component 1173 contacts the blocking component. When the elastic component 1173 does not have additional external forces, under the elastic force of the elastic component 1173, the elastic component 1173 covers at least a portion of the conductive unit 113. In embodiments of the present disclosure, since the conductive unit 113 includes two conductive components (a first conductive component 1131 and a second conductive component 1132), the blocking component includes two blocking parts 1571 to cover the first conductive component 1131 and the second conductive component 1132, respectively, as shown in the state shown in FIG. 8.

Please continue to refer to FIG. 10, which corresponds to the protective component 117 in FIG. 8 and FIG. 9. In embodiments of the present disclosure, the opening component 153 includes a pressing part 1531. The pressing part 1531 matches the matching part 1172. When the cartridge 150 is installed to the predetermined position in the accommodation cavity 112, the pressing part 1531 can push the matching part 1172, driving the blocking part 1571 to move. Thus, the blocking part 1571 releases the cover of the conductive unit 113.

Specifically, the pressing part 1531 can be an inclined rib arranged on the housing 1500 of the cartridge 150. During the process of inserting the cartridge 150 into the accommodation cavity 112, the width of the inclined rib gradually increases, thereby pushing the matching part 1172. This makes the elastic component 1173 is further compressed, and drives the blocking part 1571 to gradually release the cover on the conductive unit 113.

For ease of understanding, the movement process of the pressing part 1531 and the matching part 1172 matching with each other is described below with reference to the accompanying drawings.

Figure 14A:
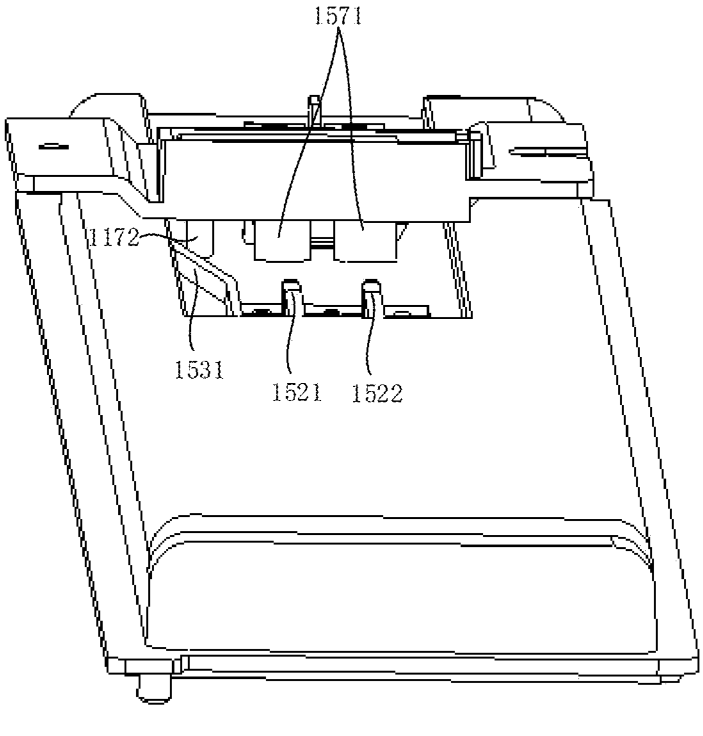
FIG. 14A to FIG. 14C illustrate a schematic diagram of a process of inserting a cartridge into an accommodation cavity according to various embodiments of the present disclosure.
Figure 14B:
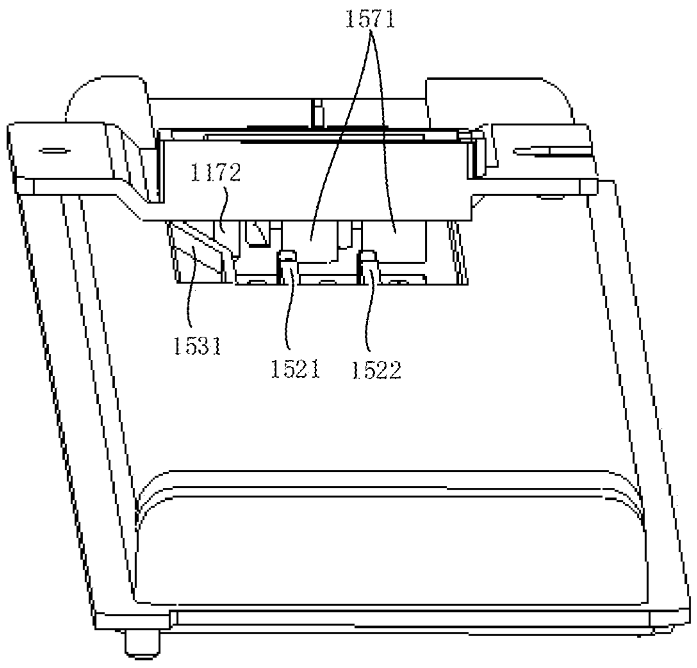
Figure 14C:
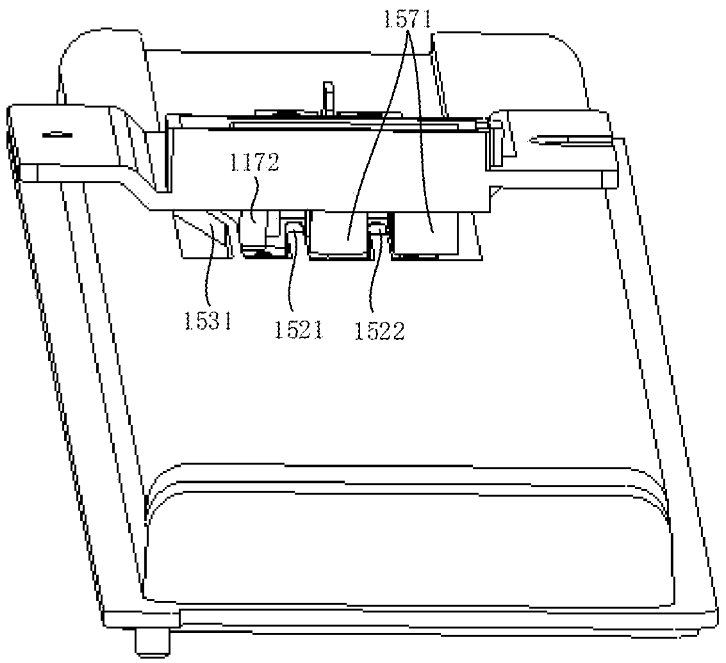

FIGS. 14A-14C are schematic diagrams of a process of inserting a cartridge into an accommodation cavity provided by embodiments of the present disclosure. In the state shown in FIG. 14A, the cartridge 150 has just been inserted into the accommodation cavity 112, the pressing part 1531 has not yet pushed the matching part 1172, and the blocking part 1571 covers the first conductive component 1131 and the second conductive component 1132. As the cartridge 150 is further inserted into the accommodation cavity 112, the pressing part 1531 pushes the matching part 1172 to move to the right (the orientation shown in FIGS. 14A-14C), thereby driving the blocking part 1571 to move to the right. Partial areas of the first conductive component 1131 and the second conductive component 1132 are exposed, as shown in the state of FIG. 14B. As the cartridge 150 is further inserted into the accommodation cavity 112, the pressing part 1531 continues to push the matching part 1172 to move to the right, thereby driving the blocking part 1571 to continue to move to the right. The first conductive component 1131 and the second conductive component 1132 are completely exposed. At the same time, the first conductive sheet 1521 and the second conductive sheet 1522 are respectively in contact with the first conductive component 1131 and the second conductive component 1132 for electrical connection, as shown in the state of FIG. 14C.

Please continue to refer to FIG. 10, in one implementation, a third groove 154 is provided on the upper surface of the cartridge 150. The assembly unit 151 and the pressing part 1531 are arranged in the third groove 154. By arranging the assembly unit 151 and the pressing part 1531 in the groove, the capacity of the cartridge 150 can be increased. On the other hand, the assembly unit 151 can be prevented from being damaged by collision with other components when it is exposed outside.

Continuing to refer to FIG. 10, the cartridge 150 in embodiments of the present disclosure further includes a storage apparatus 22 that is used to store the toner information of the cartridge 150. The storage apparatus 22 can be a chip of the cartridge, and the storage apparatus 22 includes a substrate 221 and a plurality of communication terminals 222 arranged on the substrate. The cartridge 150 is further provided with a bracket 26 that is arranged on the housing 1500 of the cartridge 150. The width of the bracket 26 is smaller than the width of the cartridge 150. It is further described that the width of the bracket 26 is smaller than the width of the upper surface of the cartridge 150. The bracket 26 is used to install the storage apparatus 22. One end of the storage apparatus 22 is fixed to the bracket by screws or rivets, and the other end of the storage apparatus 22 is fixed by snapping, so that the storage apparatus 22 is fixed to the top of the housing 1500. Further, the installation position of the storage apparatus 22 is lower than the third groove 154, or the installation position of the storage apparatus 22 is flush with the bottom surface of the third groove 154. That is, with respect to the bottom surface of the third groove 154, the first conductive sheet 1521 and the second conductive sheet 1522 protrude more from the bottom surface of the third groove 154 than the communication terminal 222, avoiding scratches on the communication terminal 222 during the installation of the cartridge 150.

Please continue to refer to FIGS. 2 to 4. In embodiments of the present disclosure, the main body 110 of the image forming apparatus includes four accommodation cavities 112Y~K. The four accommodation cavities 112Y~K are respectively used to accommodate four cartridges 150Y~K corresponding to different colors. For the convenience of explanation, the four accommodation cavities 112Y~K are respectively referred to as "yellow accommodation cavity 112Y", "magenta accommodation cavity 112M", "cyan accommodation cavity 112C", and "black accommodation cavity 112K". The four cartridges 150Y~K are respectively referred to as "yellow cartridge 150Y", "magenta cartridge 150M", "cyan cartridge 150C", and "black cartridge 150K". It can be understood that the accommodation cavities 112Y~K correspond one-to-one with the cartridges 150Y~K. When in use, the yellow cartridge 150Y, the magenta cartridge 150M, the cyan cartridge 150C, and the black cartridge 150K need to be installed in the yellow accommodation cavity 112Y, the magenta accommodation cavity 112M, the cyan accommodation cavity 112C, and the black accommodation cavity 112K respectively in that order.

In addition, four imaging assembly accommodation cavities 116Y-K are provided on the main body 110 of the image forming apparatus. The four imaging assembly accommodation cavities 116Y-K are used to accommodate four imaging assemblies corresponding to different colors. Specifically, the four imaging assembly accommodation cavities 116Y-K are respectively a yellow imaging assembly accommodation cavity 116Y, a magenta imaging assembly accommodation cavity 116M, a cyan imaging assembly accommodation cavity 116C, and a black imaging assembly accommodation cavity 116K. The four imaging assembly accommodation cavities 116Y-K are respectively used to accommodate a yellow imaging assembly, a magenta imaging assembly, a cyan imaging assembly, and a black imaging assembly.

It is understandable that if the cartridges 150Y~K of different colors and imaging assemblies of different colors are installed in the correct accommodation cavities 112Y~K. In the process of performing the image forming operation, the toner in the cartridges 150Y~K will be supplied to the imaging assemblies of the corresponding color, thereby completing the image forming operation. However, in order to reduce cost, the cartridges 150Y~K corresponding to different colors are usually set to the same structure according to a standardized processing method. Therefore, when the user installs cartridges 150Y~K of multiple colors, the installation order may be confused. For example, the magenta cartridge 150M is installed in the cyan accommodation cavity 112C, the cyan cartridge 150C is installed in the magenta accommodation cavity 112M. In this case, the magenta toner will be supplied to the cyan imaging assembly, the cyan toner will be supplied to the magenta imaging assembly, resulting in development degradation or image quality degradation, and affecting the user experience.

To address the issue, in one implementation, when multiple cartridges 150 need to be installed on the main body 110 of the image forming apparatus, assembly units 151 and pressing parts 1531 of the multiple cartridges 150 are arranged at different positions on the cartridges 150. Accordingly, the matching units 114 and the matching parts 1172 in the multiple accommodation cavities 112 are arranged at different positions on the main body 110 of the image forming apparatus. This arrangement can ensure that each cartridge 150 can only be installed in a designated accommodation cavity 112. This avoids confusion in the installation order of the cartridges 150 of multiple colors, which results in development degradation or image quality degradation.

In addition, when multiple cartridges 150 need to be installed on the main body 110 of image forming apparatus, a corresponding electric signal triggering assembly 152 is provided on each cartridge 150, and a corresponding conductive unit 113 is provided in each accommodation cavity 112, as shown in FIGS. 2 to 4. For the specific contents of the electric signal triggering assembly 152 and the conductive unit 113, please refer to the description in above embodiment, it will not be repeated here.

Figure 15:
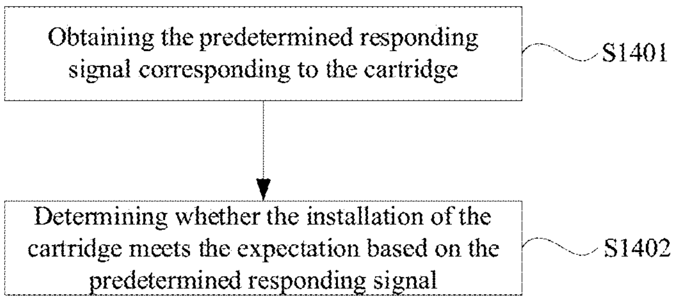
FIG. 15 illustrates a schematic diagram of a flow chart of a detection method according to various embodiments of the present disclosure.

Referring to FIG. 15, a flow chart of a detection method provided in embodiments of the present disclosure is shown. The method can be applied to an image forming apparatus 100, on which the cartridge 150 described in above embodiment is installed, as shown in FIG. 15. The method mainly includes the following steps.

Step S1401: Obtaining a predetermined responding signal corresponding to the cartridge 150.

In a specific implementation, when a plurality of cartridges 150 is installed on the image forming apparatus 100, the predetermined responding signal corresponding to each cartridge 150 can be obtained respectively. For example, when the image forming apparatus 100 is installed with a yellow cartridge 150Y, a magenta cartridge 150M, a cyan cartridge 150C, and a black cartridge 150K, respectively, predetermined responding signals corresponding to the yellow cartridge 150Y, the magenta cartridge 150M, the cyan cartridge 150C, and the black cartridge 150K are respectively obtained.

In addition, when a plurality of cartridges 150 is installed on the image forming apparatus 100, the predetermined responding signals corresponding to different cartridges 150 can be the same or different, and embodiments of the present disclosure do not limit this. Of course, in some embodiments, the predetermined responding signals corresponding to different cartridges 150 are the same, to reduce the complexity of hardware circuit or software program design.

Step S1402: Determining whether the installation of the cartridge 150 meets an expectation based on the predetermined responding signal.

In a specific implementation, it can be determined whether a predetermined responding signal is received. If the predetermined responding signal is received, it is determined that the installation of the cartridge 150 meets the expectation. If the predetermined responding signal is not received, it is determined that the installation of the cartridge 150 does not meet the expectation.

In addition, when a plurality of cartridges 150 is installed on the image forming apparatus 100, it can be determined whether the installation of the cartridge 150 meets the expectation based on the predetermined responding signal corresponding to each cartridge 150. Exemplarily, when the image forming apparatus 100 is installed with a yellow cartridge 150Y, a magenta cartridge 150M, a cyan cartridge 150C, and a black cartridge 150K, respectively, it can be determined whether the yellow cartridge 150Y, the magenta cartridge 150M, the cyan cartridge 150C, and the black cartridge 150K meet the expectation based on the predetermined responding signals corresponding to the yellow cartridge 150Y, the magenta cartridge 150M, the cyan cartridge 150C, and the black cartridge 150K.

In embodiments of the present disclosure, a predetermined responding signal is used to determine whether the installation of the cartridge 150 meets the expectation, thereby avoiding the issue of development degradation or image quality degradation caused by improper installation of the cartridge 150.

In one implementation, when it is determined that the installation of the cartridge 150 does not meet expectations, a prompt signal indicating that the installation of the cartridge 150 is abnormal is output to prompt the user that the installation of the cartridge 150 is abnormal. Thus, the user can correct the abnormally installed cartridge 150. In a specific implementation, the prompt signal can be an image signal, an audio signal, or a fault indicator light, etc., which is not limited in embodiments of the present disclosure.

In addition, when a plurality of cartridges 150 is installed on the image forming apparatus 100, the prompt signal corresponding to each cartridge 150 may be different so that the user can distinguish which cartridge 150 has a malfunction.

Embodiments of the present disclosure also provides an adapter.

Figure 16:
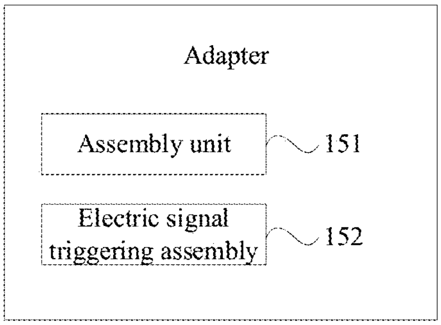
FIG. 16 illustrates a structural block diagram of an adapter according to various embodiments of the present disclosure.

FIG. 16 is a structural block diagram of an adapter provided in embodiments of the present disclosure. As shown in FIG. 16, the adapter includes the assembly unit 151 and the electric signal triggering assembly 152 shown in an above embodiment.

Specifically, the adapter can be installed on the cartridge 150, and the cartridge 150 is detachably arranged on the main body 110 of the image forming apparatus. The image forming apparatus 100 includes an accommodation cavity 112, a conductive unit 113, a matching unit 114, and an electric signal responding unit 115. The adapter includes an assembly unit 151 and an electric signal triggering assembly 152. The cartridge 150 includes an installation part for installing the assembly unit 151, and the assembly unit 151 is used to match with the matching unit 114. Thus, the cartridge 150 can be installed to a predetermined position in the accommodation cavity 112. The electric signal triggering assembly 152 is used to electrically connect with the conductive unit 113, when the electric signal triggering assembly 152 and the assembly unit 151 are installed on the cartridge 150 as well as the cartridge 150 is installed to a predetermined position in the accommodation cavity 112, and trigger the electric signal responding unit 115 to obtain a predetermined responding signal. The predetermined responding signal is used to determine whether the installation of the cartridge 150 meets the expectation.

In one implementation manner, the predetermined responding signal is a high-level signal or a low-level signal.

In one implementation, the conductive unit 113 includes a first conductive component 1131 and a second conductive component 1132. When the cartridge 150 is not installed to a predetermined position in the accommodation cavity 112, the first conductive component 1131 and the second conductive component 1132 are electrically isolated from each other. When the cartridge 150 is installed with an electric signal triggering assembly 152 and an assembly unit 151 as well as the cartridge 150 is installed to a predetermined position in the accommodation cavity 112, the electric signal triggering assembly 152 is electrically connected to the first conductive component 1131 and the second conductive component 1132, respectively, to trigger the electric signal responding unit 115 to obtain a predetermined responding signal.

In one possible implementation, when the cartridge 150 is installed with an electric signal triggering assembly 152 and an assembly unit 151 as well as the cartridge 150 is installed to a predetermined position in the accommodation cavity 112, the electric signal triggering assembly 152 contacts and electrically connects with the first conductive component 1131 and the second conductive component 1132 respectively, triggering the electric signal responding unit 115 to obtain a predetermined responding signal.

In one implementation, the electric signal triggering assembly 152 includes a first conductive sheet 1521 and a second conductive sheet 1522. The first conductive sheet 1521 and the second conductive sheet 1522 are electrically connected. When the cartridge 150 is installed with an electric signal triggering assembly 152 and an assembly unit 151 as well as the cartridge 150 is installed to a predetermined position in the accommodation cavity 112, the first conductive sheet 1521 is used to be electrically connected to the first conductive component 1131, and the second conductive sheet 1522 is used to be electrically connected to the second conductive component 1132. Thus, the first conductive component 1131 is electrically connected to the second conductive component 1132, thereby triggering the electric signal responding unit 115 to obtain a predetermined responding signal.

In one implementation, the electric signal triggering assembly 152 includes a first conductive sheet 1521 and a second conductive sheet 1522. The first conductive sheet 1521 and the second conductive sheet 1522 are electrically connected. When the cartridge 150 is installed with an electric signal triggering assembly 152 and an assembly unit 151 as well as the cartridge 150 is installed to a predetermined position in the accommodation cavity 112, the first conductive sheet 1521 is used to contact and electrically connect with the first conductive component 1131, and the second conductive sheet 1522 is used to contact and electrically connect with the second conductive component 1132. Thus, the first conductive component 1131 is electrically connected with the second conductive component 1132, thereby triggering the electric signal responding unit 115 to obtain a predetermined responding signal.

In one implementation, the first conductive sheet 1521 and the second conductive sheet 1522 include one metal conductive sheet or a plurality of metal conductive sheets electrically connected to each other.

Please note, the specific contents of embodiments of the present disclosure can be found in the description of above embodiments, and will not be repeated here.

Corresponding to an embodiment, embodiments of the present disclosure further provide a cartridge 150.

Figure 17:
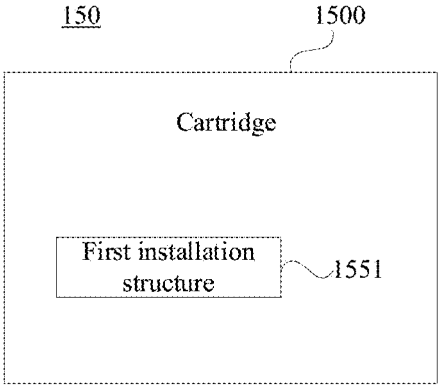
FIG. 17 illustrates a structural block diagram of a cartridge according to various embodiments of the present disclosure.

FIG. 17 is a structural block diagram of a cartridge provided in embodiments of the present disclosure. As shown in FIG. 17, the cartridge 150 includes a housing 1500, on which a first installation structure 1551 is provided. The first installation structure 1551 is used to install the assembly unit 151 shown in an above embodiment.

Please note that the specific contents of embodiments of the present disclosure can be found in the description of above embodiments, and will not be repeated here.

Corresponding to the above embodiment, embodiments of the present disclosure also provide another cartridge 150.

Figure 18:
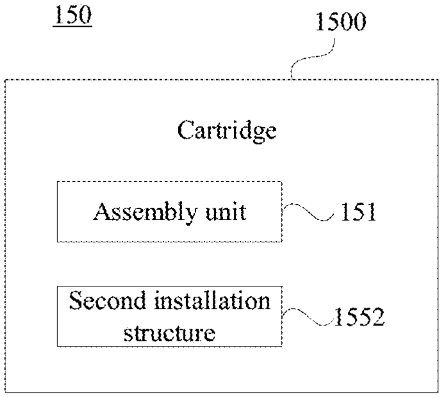
FIG. 18 illustrates a structural block diagram of another cartridge according to various embodiments of the present disclosure.

FIG. 18 is a structural block diagram of another cartridge provided in embodiments of the present disclosure. As shown in FIG. 18, the cartridge 150 includes a housing 1500, an assembly unit 151, and a second installation structure 1552. The assembly unit 151 is arranged on the housing 1500 and is used to match the matching unit 114 in the accommodation cavity 112 of the image forming apparatus 100. Thus, the cartridge 150 can be installed to a predetermined position in the accommodation cavity 112. The second installation structure 1552 is used to install the electric signal triggering assembly 152 described in an above embodiment.

Please note that the specific contents of embodiments of the present disclosure can be found in the description of above embodiments, and will not be repeated here.

Corresponding to an above embodiment, embodiments of the present disclosure also provide another cartridge 150.

Figure 19:
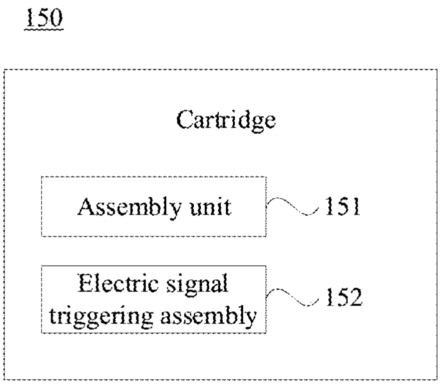
FIG. 19 illustrates a structural block diagram of another cartridge according to various embodiments of the present disclosure.

FIG. 19 is a structural block diagram of another cartridge provided in embodiments of the present disclosure. The cartridge 150 is detachably installed on a main body 110 of an image forming apparatus. The image forming apparatus 100 includes an accommodation cavity 112, a conductive unit 113, a matching unit 114, and an electric signal responding unit 115.

As shown in FIG. 19, the cartridge 150 includes an assembly unit 151 that is arranged on the housing 1500. The assembly unit 151 is used to match the matching unit 114 in the accommodation cavity 112, so that the cartridge 150 can be installed to a predetermined position in the accommodation cavity 112. An electric signal triggering assembly 152 which is arranged on the assembly unit 151, is used for electrically connecting to the conductive unit 113 and triggering the electric signal responding unit 115 to obtain a predetermined response signal, when the cartridge 150 is installed to a predetermined position in the accommodation cavity 112. The predetermined responding signal is used to determine whether the installation of the cartridge 150 meet an expectation.

In one implementation manner, the predetermined responding signal is a high-level signal or a low-level signal.

In one implementation, the conductive unit 113 includes a first conductive component 1131 and a second conductive component 1132. When the cartridge 150 is not installed to a predetermined position in the accommodation cavity 112, the first conductive component 1131 and the second conductive component 1132 are electrically isolated from each other.

When the cartridge 150 is installed to the predetermined position in the accommodation cavity 112, the electric signal triggering assembly 152 is electrically connected to the first conductive component 1131 and the second conductive component 1132 respectively, triggering the electric signal responding unit 115 to obtain the predetermined responding signal.

In one implementation, when the cartridge 150 is installed to the predetermined position in the accommodation cavity 112, the electric signal triggering assembly 152 contacts and electrically connects with the first conductive component 1131 and the second conductive component 1132 respectively, triggering the electric signal responding unit 115 to obtain a predetermined responding signal.

In one implementation, the electric signal triggering assembly 152 includes a first conductive sheet 1521 and a second conductive sheet 1522. The first conductive sheet 1521 and the second conductive sheet 1522 are electrically connected. When the cartridge 150 is installed to a predetermined position in the accommodation cavity 112, the first conductive sheet 1521 is used to be electrically connected to the first conductive component 1131, and the second conductive sheet 1522 is used to be electrically connected to the second conductive component 1132. Thus, the first conductive component 1131 is electrically connected to the second conductive component 1132, thereby triggering the electric signal responding unit 115 to obtain a predetermined responding signal.

In one implementation, the electric signal triggering assembly 152 includes a first conductive sheet 1521 and a second conductive sheet 1522. The first conductive sheet 1521 and the second conductive sheet 1522 are electrically connected. When the cartridge 150 is installed to the predetermined position in the accommodation cavity 112, the first conductive sheet 1521 is used to contact and electrically connect with the first conductive component 1131, and the second conductive sheet 1522 is used to contact and electrically connect with the second conductive component 1132. Thus, the first conductive component 1131 is electrically connected with the second conductive component 1132, thereby triggering the electric signal responding unit 115 to obtain the predetermined responding signal.

In one implementation, the first conductive sheet 1521 and the second conductive sheet 1522 include one metal conductive sheet or a plurality of metal conductive sheets electrically connected to each other.

In one implementation, the assembly unit 151 is a first protrusion 1511, the matching unit 114 is a first groove 1141 matching the first protrusion 1511, and the electric signal triggering unit is arranged on the first protrusion 1511. Alternatively, the assembly unit 151 is a second groove, the matching unit 114 is a second protrusion matching the second groove, and the electric signal triggering unit is arranged in the second groove.

In one implementation, a protective component 117 is further provided in the accommodation cavity 112. The protective component 117 is used to cover at least a portion of the conductive unit 113 to protect the conductive unit 113, when the cartridge 150 is not installed to the predetermined position in the accommodation cavity 112. An opening component 153 is also provided on the housing 1500 of the cartridge 150. The opening component 153 is used to trigger the protective component 117 to release the cover of the conductive unit 113, when the cartridge 150 is installed to the predetermined position in the accommodation cavity 112.

In one implementation, the protective component 117 includes a blocking component and an elastic component 1173. The blocking component includes a blocking part 1571 and a matching part 1172. The blocking part 1571 is used to cover at least a portion of the conductive unit 113 under the elastic force of the elastic component 1173, when the cartridge 150 is not installed to the predetermined position in the accommodation cavity 112. The opening component 153 includes a pressing part 1531 which matches the matching part 1172. The pressing part 1531 is used to push the matching part 1172, when the cartridge 150 is installed to the predetermined position in the accommodation cavity 112, thereby driving the blocking part 1571 to move. Thus, the blocking part 1571 releases the cover on the conductive unit 113.

In one implementation, the cartridge 150 includes an upper surface. The upper surface is provided with a third groove 154 for accommodation the assembly unit 151 and the pressing part 1531.

Please note that the specific contents of embodiments of the present disclosure can be found in the description of above embodiments, and will not be repeated here.

Embodiments of the present disclosure also provide a cartridge assembly.

Figure 20:
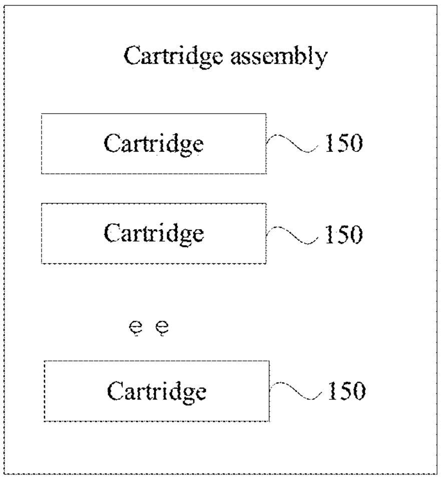
FIG. 20 illustrates a structural block diagram of a cartridge assembly according to various embodiments of the present disclosure.

FIG. 20 is a structural block diagram of a cartridge assembly provided in embodiments of the present disclosure. As shown in FIG. 20, the cartridge assembly includes a plurality of cartridges 150.

In one implementation, when the cartridge assembly is installed on the main body 110 of the image forming apparatus, the plurality of cartridges 150 is arranged in a row. Assembly units 151 and pressing parts 1531 of the plurality of cartridges 150 are disposed at different positions on the plurality of cartridges 150.

In addition, four imaging assembly accommodation cavities 116Y~K are provided on the main body 110 of the image forming apparatus. The four imaging assembly accommodation cavities 116Y~K are used to accommodate four imaging assemblies corresponding to different colors. Specifically, the four imaging assembly accommodation cavities 116Y~K are respectively a yellow imaging assembly accommodation cavity 116Y, a magenta imaging assembly accommodation cavity 116M, a cyan imaging assembly accommodation cavity 116C, and a black imaging assembly accommodation cavity 116K. The four imaging assembly accommodation cavities 116Y~K are respectively used to accommodate a yellow imaging assembly, a magenta imaging assembly, a cyan imaging assembly, and a black imaging assembly. Specifically, each of the imaging assemblies 116Y~K includes a photosensitive drum, a cleaning blade, a discharger, a charging component, and a developing component. The charging component can make the surface of the photosensitive drum uniformly charged. An exposure component exposes and scans the photosensitive drum through a laser so that the uniformly charged surface of the photosensitive drum carries an electrostatic latent image. The electrostatic latent image is developed by the developing component and toner, then transferred to an intermediate transfer belt. After the transfer is completed, the cleaning blade removes the toner remaining on the surface of the photosensitive drum. The discharger removes the charge remaining on the photosensitive drum, making the photosensitive drum ready for the next imaging.

Please note that in the cartridge type shown in embodiments of the present disclosure, a photosensitive drum, a charging roller, and a developing device storing toner are integrated to form a cartridge. The cartridge is configured to be removable from the main body 110 of the image forming apparatus 100. Further, although the cartridge is described as an example above, the present disclosure does not limit it. For example, it can use a developing cartridge including toner and a developing device but not a photosensitive drum. Alternatively, it can use a toner cylinder that does not include a roller. In some embodiments, it can use a photosensitive drum cartridge that does not include a developing device but integrates a photosensitive drum and a charging roller.

Please note the specific contents of embodiments of the present disclosure can be found in the description of above embodiments, and will not be repeated here.

Corresponding to an above embodiment, embodiments of the present disclosure further provide another image forming apparatus 100.

Figure 21:
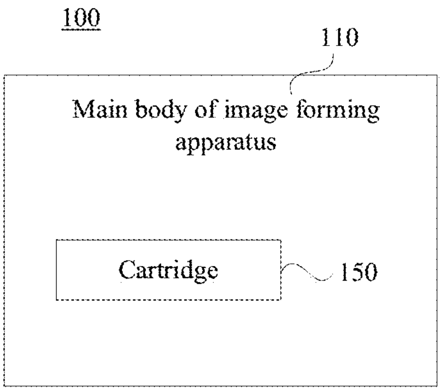
FIG. 21 illustrates a structural block diagram of another image forming apparatus according to various embodiments of the present disclosure.

FIG. 21 is a structural block diagram of another image forming apparatus provided in embodiments of the present disclosure. As shown in FIG. 21, the image forming apparatus 100 includes a main body 10 of an image forming apparatus and the cartridge 150 described in an above embodiment.

Please note, the specific contents of embodiments of the present disclosure can be found in the description of above embodiments, and will not be repeated here.

Corresponding to an above embodiment, embodiments of the present disclosure further provide another image forming apparatus 100.

Figure 22:
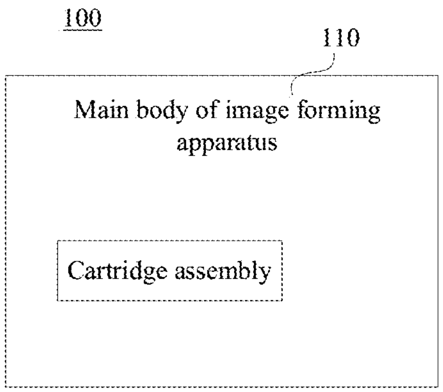
FIG. 22 illustrates a structural block diagram of another image forming apparatus according to various embodiments of the present disclosure.

FIG. 22 is a structural block diagram of another image forming apparatus provided in embodiments of the present disclosure. As shown in FIG. 22, the image forming apparatus 100 includes a main body 110 of an image forming apparatus and the cartridge assembly described in an above embodiment.

Please note that the specific contents of embodiments of the present disclosure can be found in the description of above embodiments, and will not be repeated here.

Corresponding to an above embodiment, embodiments of the present disclosure further provide another image forming apparatus 100.

Figure 23:
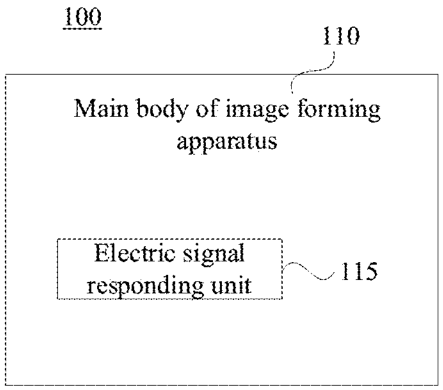
FIG. 23 illustrates a structural block diagram of another image forming apparatus according to various embodiments of the present disclosure.

FIG. 23 is a block diagram of another image forming apparatus provided in embodiments of the present disclosure. As shown in FIG. 23, the image forming apparatus 100 includes a main body 110 of an image forming device. The main body 110 of the image forming device includes a frame 111 and an accommodation cavity 112. The accommodation cavity 112 is used to accommodate the cartridge 150. The accommodation cavity 112 is provided with a matching unit 114. The matching unit 114 is provided with a first conductive component 1131 and a second conductive component 1132. The main body 110 of the image forming device includes an electric signal responding unit 115. The electric signal responding unit 115 is electrically connected to the first conductive component 1131. The electric signal responding unit 115 is used to obtain a predetermined responding signal, when the cartridge 150 is installed to a predetermined position in the accommodation cavity 112, and determine whether the installation of the cartridge 150 meets with an expectation based on the predetermined responding signal.

In one implementation, when the cartridge 150 is not installed to the predetermined position in the accommodation cavity 112, the first conductive component 1131 and the second conductive component 1132 are in an electrically isolated state. When the cartridge 150 is installed to the predetermined position in the accommodation cavity 112, the first conductive component 1131 and the second conductive component 1132 are in an electrically connected state, and the electric signal responding unit 115 is used to obtain a predetermined responding signal and determine whether the installation of the cartridge 150 meets the expectation based on the predetermined responding signal.

In one implementation, the frame 111 includes a top plate and a side plate that are adjacently arranged. The first conductive component 1131 and the second conductive component 1132 are arranged on the top plate, and the electric signal responding unit 115 is arranged on the side plate.

In one implementation, a protective component 117 is further provided in the accommodation cavity 112. The protective component 117 includes a blocking component. The blocking component includes a blocking part 1571 and a matching part 1172. The blocking part 1571 is used to cover at least a portion of the first conductive component 1131 and the second conductive component 1132, when the cartridge 150 is not installed to the predetermined position in the accommodation cavity 112. The matching part 1172 is used to be pushed by the pressing part 1531 on the cartridge 150, when the cartridge 150 is installed to the predetermined position in the accommodation cavity 112. This drives the blocking part 1571 to move, so that the blocking part 1571 is opened.

In one implementation, the protective component 117 also includes an elastic component 1173. When the cartridge 150 is installed to a predetermined position in the accommodation cavity 112, the elastic component 1173 is compressed during the movement of the blocking part 1571. When the cartridge 150 is removed from the accommodation cavity 112, the blocking part moves under the action of the elastic force to a position covering at least a portion of the first conductive component 1131 and the second conductive component 1132.

Please note that the specific contents of embodiments of the present disclosure can be found in the description of above embodiments, and will not be repeated here.

Corresponding to an above embodiment, embodiments of the present disclosure further provide another image forming apparatus 100.

Figure 24:
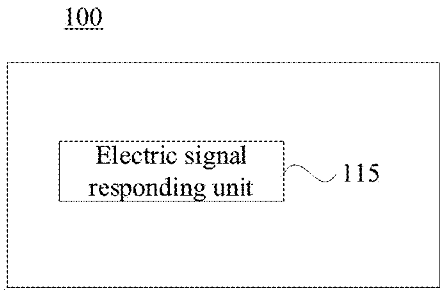
FIG. 24 illustrates a structural block diagram of another image forming apparatus according to various embodiments of the present disclosure.

FIG. 24 is a structural block diagram of another image forming apparatus provided in embodiments of the present disclosure. As shown in FIG. 24, the image forming device 100 includes an electric signal responding unit 115. The electric signal responding unit 115 is used to execute the detection method described in an above method embodiment.

Please note that the specific contents of embodiments of the present disclosure can be found in the description of above embodiments, and will not be repeated here.

For ease of understanding, the image forming apparatus is exemplarily described below in conjunction with the specific structure of an image forming apparatus.

Figure 25:
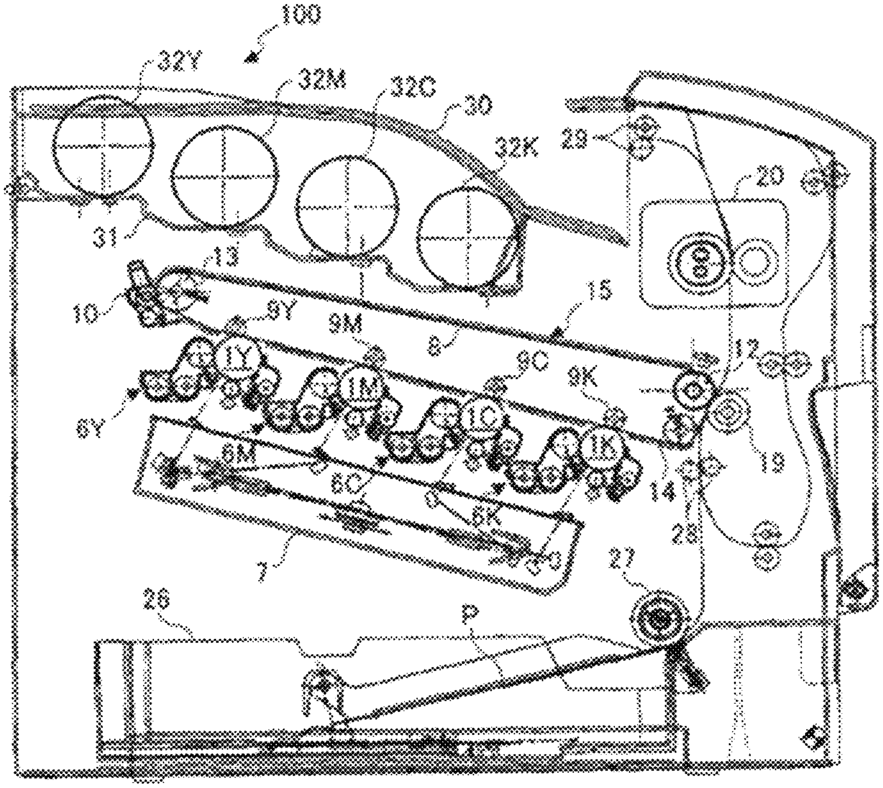
FIG. 25 illustrates a schematic structural diagram of another image forming apparatus according to various embodiments of the present disclosure.

FIG. 25 is a schematic structural diagram of another image forming apparatus provided in embodiments of the present disclosure. As shown in FIG. 25, the image forming apparatus 100 is provided with four process cartridges 6Y, 6M, 6C and 6K for generating yellow, magenta, cyan and black toner images (referred to as Y, M, C and K toner images). The process cartridges use Y, M, C and K toners having different colors from each other as image forming substrates, but the four process cartridges have a same structure and can be replaced with new process cartridges when toners are replenished. A process cartridge 6Y that produces a Y toner image is considered as a representative example of the four process cartridges. As shown in FIG. 25, the process cartridge 6Y includes a drum-shaped photoconductor 1Y, a drum cleaning apparatus 2Y, a discharger (not shown), a charging apparatus 4Y, and a developing apparatus 5Y. The process cartridge 6Y is detachably installed on the main body of the image forming apparatus 100, and these parts can be replaced with at a time. The charging apparatus 4Y uniformly charges the surface of the photoconductor 1Y rotated in the clockwise direction by a driving unit (not shown). Exposure scanning is performed by laser light L, and thus the surface of the uniformly charged photoconductor 1Y carries an electrostatic latent image. The Y electrostatic latent image is developed by the developing apparatus 5Y using Y toner for the Y toner image. Moreover, intermediate transfer is performed on the intermediate transfer belt 8. After experiencing the intermediate transfer process, the drum cleaning apparatus 2Y removes the toner remaining on the surface of the photoconductor 1Y. In addition, the discharger discharges the residual charge of the photoconductor 1Y after cleaning. The surface of the photoconductor 1Y is initialized by discharge, preparing for the next imaging. Similarly, in other process cartridges 6M, 6C and 6K, M, C and K toner images are similarly formed on the photoconductors 1M, 1C and 1K, and intermediate transfer is performed on the intermediate transfer belt 8. The exposure apparatus 7 is provided in the lower part of each process cartridge 6Y, 6M, 6C and 6K in FIG. 25. The exposure apparatus 7 serving as a latent image forming unit irradiates each photoconductor in the process cartridges 6Y, 6M, 6C, and 6K with laser light L emitted based on image information. Exposure of each photoconductor with the laser light L is performed. Regarding the exposure, electrostatic latent images of Y, M, C, and K are formed on the photoconductors 1Y, 1M, 1C, and 1K. In addition, the exposure apparatus 7 irradiates the photoconductor through two or more optical lenses and a reflecting mirror, by scanning the laser light (L) emitted from the light source by a polygon mirror rotated by a rotary drive motor. A paper feeding unit includes a paper receiving cassette 26. The paper feeding unit is provided in the bottom of the exposure apparatus 7. A paper feeding roller 27 and a resist roller pair 28 are provided in the paper receiving cassette. In the paper receiving cassette 26, a large amount of copy paper P is accommodated, and the paper feeding roller 27 contacts the copy paper P at the top of the large amount of copy paper. When the paper feeding roller 27 rotates counterclockwise due to a driving unit (not shown), the top copy paper P is conveyed to a position between rollers of the resist roller pair 28. Although the resist roller pair 28 performs the rotational drive of the rollers to clamp the copy paper P, the rotational drive is stopped immediately. The copy paper P is conveyed to a secondary transfer nip area by the resist roller pair 28 at an appropriate time. In the paper feeding unit, a combination of the paper feeding roller 27 and the resist roller pair 28 (timing roller pair) is used to constitute a conveying unit. The conveying unit conveys the copy paper P from the paper receiving cassette 26 to the secondary transfer nip. An intermediate transfer unit 15 for performing intermediate image transfer using a circular intermediate transfer belt 8 (intermediate transfer medium) is provided on the upper part of each of the process cartridges 6Y, 6M, 6C and 6K. The intermediate transfer unit 15 is equipped with four primary transfer bias rollers 9Y, 9M, 9C and 9K, a cleaning apparatus 10, and an intermediate transfer belt 8. In addition, the intermediate transfer unit 15 includes a secondary transfer support roller 12, a cleaning support roller 13, a tension roller, etc. The circular transfer is performed by the rotational drive of at least one of these three rollers as the intermediate transfer belt 8 rotates counterclockwise. By this means, the primary transfer bias rollers 9Y, 9M, 9C, and 9K place the intermediate transfer belt 8, performing the circular transfer, between the photoconductors 1Y, 1M, 1C, and 1K. This forms primary transfer nips, respectively. In this transfer, the toner presses a transfer bias component with an opposite polarity (for example, positive) to the back side (inner surface of the loop) of the intermediate transfer belt 8. All rollers except the primary transfer bias rollers 9Y, 9M, 9C and 9K are electrically grounded. With the circular transfer, the intermediate transfer belt 8 undergoes a process of passing through the Y, M, C and K primary transfer nipples one by one, and the Y, M, C, K toner images of the photoconductors 1Y, 1M, 1C and 1K are superimposed, which are primary transferred. Therefore, a toner image of four colors superimposed (referred to as a 4-color toner image) is formed on the intermediate transfer belt 8. With the circular transfer, the intermediate transfer belt 8 undergoes a process of passing through the Y, M, C and K primary transfer nips one by one, and the Y, M, C, K toner images of the photoconductors 1Y, 1M, 1C and 1K are superimposed, which are primary transferred. Therefore, a toner image of four colors (referred to as a 4-color toner image) is formed on the intermediate transfer belt 8. In a secondary transfer nip, it is inserted between the intermediate transfer belt 8 and the secondary transfer roller 19, where the copy paper P is transferred on the surface in the forward direction, and the above-mentioned abutting roller pair 28 side is conveyed in the opposite direction. When the copy paper P sent out from the secondary transfer nip passes between the rollers of the fixing device 20, the surface-transferred 4-color toner image is fixed by heat and pressure. Subsequently, the copy paper P is conveyed through the discharge roller pair 29 and discharged to outside of the image forming apparatus. A stacking part 30 is provided on the upper surface of a main part of the image forming apparatus. The copy paper P discharged from the discharge roller pair 29 to the outside of the image forming apparatus is stacked one by one on the stacking part 30.

Corresponding to above embodiments, the embodiment of the present disclosure further provides a computer program product, which includes executable instructions. When the executable instructions are executed on a computer, the computer executes some or all the steps in method embodiments.

Those persons of skilled in the art can clearly understand that, for the convenience and brevity of description, specific working processes of the systems, apparatuses, and units described above can refer to the corresponding processes in method embodiments and will not be repeated here.

In some embodiments, if any function is implemented in the form of a software functional unit and sold or used as an independent product, it can be stored in a computer-readable storage medium. Based on this understanding, the technical solution of the present disclosure is essentially or the part that contributes to the prior art or the part of the technical solution can be embodied in the form of a software product. The computer software product is stored in a storage medium, including a number of instructions to enable a computer device (which can be a personal computer, a server, or a network device, etc.) to perform all or part of the steps of a method described in each embodiment of the present disclosure. The storage medium includes: U disk, mobile hard disk, read-only memory (ROM), random access memory (RAM), disk, or optical disk, and other media that can store program codes.

What is claimed is:

1. An adapter, installed on a cartridge that is detachably arranged on an image forming apparatus, the image forming apparatus comprising an accommodation cavity, a conductive unit, and an electric signal responding unit, wherein the adapter comprises an electric signal triggering assembly; and the electric signal triggering assembly is configured to electrically connect with the conductive unit and trigger the electric signal responding unit to obtain a predetermined responding signal, when the electric signal triggering assembly is installed on the cartridge and the cartridge is installed to a predetermined position in the accommodation cavity; a voltage of the predetermined responding signal is different from a voltage obtained by the electric signal responding unit from the conductive unit when the cartridge is not installed to the predetermined position in the accommodation cavity; and the predetermined responding signal is configured to determine whether the cartridge is installed to the predetermined position in the accommodation cavity.

2. The adapter according to claim 1, wherein the image forming apparatus further includes a matching unit and the adapter further includes an assembly unit configured to cooperate with the matching unit, making the cartridge to be installed to the predetermined position in the accommodation cavity; or the cartridge comprises the assembly unit, the electric signal triggering assembly is installed on the assembly unit of the cartridge.

3. The adapter according to claim 1, wherein the predetermined responding signal is a high-level signal or a low-level signal.

4. The adapter according to claim 1, wherein the conductive unit comprises a first conductive component and a second conductive component; and when the cartridge is not installed to the predetermined position in the accommodation cavity, the first conductive component and the second conductive component are electrically isolated; and when the electric signal triggering assembly is installed on the cartridge and the cartridge is installed to the predetermined position in the accommodation cavity, the electric signal triggering assembly is electrically connected to the first conductive component and the second conductive component respectively, triggering the electric signal responding unit to obtain the predetermined responding signal.

5. The adapter according to claim 4, wherein the electric signal triggering assembly comprises a first conductive sheet and a second conductive sheet; the first conductive sheet and the second conductive sheet are electrically connected; when the electric signal triggering assembly is installed on the cartridge and the cartridge is installed to the predetermined position in the accommodation cavity, the first conductive sheet is configured to be electrically connected to the first conductive component, and the second conductive sheet is configured to be electrically connected to the second conductive component; and the first conductive component is electrically connected to the second conductive component, for triggering the electric signal responding unit to obtain the predetermined responding signal.

6. The adapter according to claim 5, wherein at least one of the first conductive sheet and the second conductive sheet comprises a metal conductive sheet or a plurality of metal conductive sheets electrically connected to each other.

7. A cartridge, detachably arranged on an image forming apparatus, wherein the image forming apparatus comprises an accommodation cavity, a conductive unit, and an electric signal responding unit; and the cartridge comprises:

an electric signal triggering assembly, configured to electrically connect with the conductive unit and trigger the electric signal responding unit to obtain a predetermined responding signal, when the cartridge is installed to a predetermined position in the accommodation cavity; a voltage of the predetermined responding signal is different from a voltage obtained by the electric signal responding unit from the conductive unit when the cartridge is not installed to the predetermined position in the accommodation cavity; and the predetermined responding signal being configured to determine whether the cartridge is installed to the predetermined position in the accommodation cavity.

8. The cartridge according to claim 7, wherein the predetermined responding signal is a high-level signal or a low-level signal.

9. The cartridge according to claim 7, wherein the conductive unit comprises a first conductive component and a second conductive component; and when the cartridge is not installed to the predetermined position in the accommodation cavity, the first conductive component and the second conductive component are electrically isolated from each other; and when the cartridge is installed to the predetermined position in the accommodation cavity, the electric signal triggering assembly is electrically connected to the first conductive component and the second conductive component respectively, triggering the electric signal responding unit to obtain the predetermined responding signal.

10. The cartridge according to claim 9, wherein the electric signal triggering assembly comprises a first conductive sheet and a second conductive sheet; the first conductive sheet and the second conductive sheet are electrically connected; when the cartridge is installed to the predetermined position in the accommodation cavity, the first conductive sheet is configured to be electrically connected to the first conductive component, and the second conductive sheet is configured to be electrically connected to the second conductive component; and the first conductive component is electrically connected to the second conductive component, for triggering the electric signal responding unit to obtain the predetermined responding signal.

11. The cartridge according to claim 10, wherein at least one of the first conductive sheet and the second conductive sheet comprises a metal conductive sheet or a plurality of metal conductive sheets electrically connected to each other.

12. The cartridge according to claim 7, wherein the cartridge includes an assembly unit and the image forming apparatus includes a matching unit, and wherein the assembly unit is a first protrusion; the matching unit is a first groove matching the first protrusion; and the electric signal triggering assembly is arranged on the first protrusion; or the assembly unit is a second groove; the matching unit is a second protrusion matching the second groove; and the electrical signal triggering assembly is arranged in the second groove.

13. The cartridge according to claim 7, wherein a protective component is further provided in the accommodation cavity; the protective component is configured to cover at least a portion of the conductive unit to protect the conductive unit, when the cartridge is not installed to the predetermined position in the accommodation cavity; and an opening component is also provided on the cartridge; the opening component is configured to trigger the protective component to release a covering of the conductive unit when the cartridge is installed to the predetermined position in the accommodation cavity.

14. The cartridge according to claim 13, wherein the protective component comprises a blocking component and an elastic component; the blocking component comprises a blocking part and a matching part; the blocking part is configured to cover at least the portion of the conductive unit under an elastic force of the elastic component when the cartridge is not installed to the predetermined position in the accommodation cavity; and the opening component comprises a pressing part; the pressing part matches the matching part; the pressing part is configured to push the matching part to drive the blocking part to move, when the cartridge is installed to the predetermined position in the accommodation cavity, to release the covering of the conductive unit.

15. The cartridge according to claim 14, further comprising an upper surface, wherein the upper surface is provided with a groove for accommodating the assembly unit and the pressing part.

16. An image forming apparatus comprising an accommodation cavity to accommodate a cartridge;

a conductive unit; and an electric signal responding unit, configured to electrically connect with the cartridge to obtain a predetermined responding signal, when the cartridge is installed to a predetermined position in the accommodation cavity; a voltage of the predetermined responding signal is different from a voltage obtained by the electric signal responding unit from the conductive unit when the cartridge is not installed to the predetermined position in the accommodation cavity; and the predetermined responding signal is configured to determine whether the cartridge is installed to the predetermined position in the accommodation cavity.

17. The image forming apparatus according to claim 16, wherein the conductive unit includes a first conductive component and a second conductive component, and wherein when the cartridge is not installed to the predetermined position in the accommodation cavity, the first conductive component and the second conductive component are in an electrically isolated state, when the cartridge is installed to the predetermined position in the accommodation cavity, the first conductive component and the second conductive component are in an electrically connected state, and the electric signal responding unit obtains the predetermined responding signal and determines whether the installation of the cartridge meets the expectation based on the predetermined responding signal.

18. The image forming apparatus according to claim 16, wherein the image forming apparatus further includes a frame, the conductive unit includes a first conductive component and a second conductive component, and wherein the frame includes a top plate and a side plate, the first conductive component and the second conductive component are arranged on the top plate, and the electric signal responding unit is arranged on the side plate.

19. The image forming apparatus according to claim 16, wherein a protective component is further provided in the accommodation cavity, the protective component is configured to cover at least a portion of the conductive unit, when the cartridge is not installed to the predetermined position in the accommodation cavity.

20. The image forming apparatus according to claim 19, wherein the protective component also includes an elastic component, when the cartridge is installed to the predetermined position in the accommodation cavity, the elastic component is compressed.

* * * * *